US012795666B2

(12) United States Patent
Ryu et al.

(10) Patent No.: US 12,795,666 B2
(45) Date of Patent: Nov. 10, 2026

(54) USER EQUIPMENT CAPABILITIES FOR DOWNLINK CHANNEL ESTIMATIONS ASSOCIATED WITH SUBBAND FULL DUPLEX OPERATIONS

(71) Applicant: QUALCOMM Incorporated, San Diego, CA (US)

(72) Inventors: Jae Ho Ryu, San Diego, CA (US); Muhammad Sayed Khairy Abdelghaffar, San Jose, CA (US); Jae Won Yoo, San Diego, CA (US); James Beckman, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 305 days.

(21) Appl. No.: 18/406,801

(22) Filed: Jan. 8, 2024

(65) Prior Publication Data

US 2024/0381351 A1 Nov. 14, 2024

Related U.S. Application Data

(60) Provisional application No. 63/501,277, filed on May 10, 2023.

(51) Int. Cl.

| | |
|---|---|
| ***H04W 72/1273*** | (2023.01) |
| ***H04L 5/00*** | (2006.01) |
| ***H04L 5/14*** | (2006.01) |
| ***H04W 72/51*** | (2023.01) |

(52) U.S. Cl.

CPC ....... *H04W 72/1273* (2013.01); *H04L 5/0051* (2013.01); *H04L 5/14* (2013.01); *H04W 72/51* (2023.01)

(58) Field of Classification Search

CPC .............. H04W 72/1273; H04W 72/51; H04L 5/0051; H04L 5/14; H04L 5/0048

See application file for complete search history.

(56) References Cited

U.S. PATENT DOCUMENTS

| | | | | |
|---|---|---|---|---|
| 2019/0132100 | A1* | 5/2019 | Na | H04B 7/0413 |
| 2021/0111845 | A1* | 4/2021 | Bae | H04W 72/1273 |
| 2022/0014342 | A1* | 1/2022 | Abotabl | H04L 5/1423 |
| 2022/0045789 | A1* | 2/2022 | Karmoose | H04L 1/0041 |
| 2022/0394732 | A1* | 12/2022 | Hosseini | H04L 5/14 |
| 2023/0179369 | A1* | 6/2023 | Xu | H04L 5/0094 370/336 |
| 2023/0328656 | A1* | 10/2023 | Rudolf | H04W 52/24 |
| 2024/0039655 | A1* | 2/2024 | Rudolf | H04W 72/0446 |
| 2024/0056216 | A1* | 2/2024 | Zhang | H04L 1/0025 |
| 2024/0056283 | A1* | 2/2024 | Abdelghaffar | H04L 5/001 |
| 2024/0381115 | A1* | 11/2024 | Beckman | H04W 16/28 |
| 2024/0381351 | A1* | 11/2024 | Ryu | H04W 72/1273 |
| 2025/0055663 | A1* | 2/2025 | Park | H04L 5/0007 |
| 2025/0062871 | A1* | 2/2025 | Ibrahim | H04L 5/14 |
| 2025/0097918 | A1* | 3/2025 | Lei | H04W 72/0453 |
| 2025/0184975 | A1* | 6/2025 | Lu | H04L 5/1469 |
| 2025/0203583 | A1* | 6/2025 | Nemeth | H04L 5/0044 |

* cited by examiner

*Primary Examiner* — Ivan O Latorre
(74) *Attorney, Agent, or Firm* — Harrity & Harrity, LLP

(57) ABSTRACT

Various aspects of the present disclosure generally relate to wireless communication. In some aspects, a user equipment (UE) may transmit an indication of a UE capability for a physical downlink shared channel (PDSCH) channel estimation for a subband full duplex (SBFD) operation. The UE may demodulate a PDSCH scheduled based at least in part on the UE capability. Numerous other aspects are described.

30 Claims, 21 Drawing Sheets

USER EQUIPMENT CAPABILITIES FOR DOWNLINK CHANNEL ESTIMATIONS ASSOCIATED WITH SUBBAND FULL DUPLEX OPERATIONS

CROSS-REFERENCE TO RELATED APPLICATION

This patent application claims priority to U.S. Provisional Patent Application No. 63/501,277, filed on May 10, 2023, entitled "USER EQUIPMENT CAPABILITIES FOR DOWNLINK CHANNEL ESTIMATIONS ASSOCIATED WITH SUBBAND FULL DUPLEX OPERATIONS," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for user equipment (UE) capabilities for downlink channel estimations for subband full duplex (SBFD) operations.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some implementations, an apparatus for wireless communication at a user equipment (UE) includes one or more memories and one or more processors, coupled to the one or more memories, configured to: transmit an indication of a UE capability for a physical downlink shared channel (PDSCH) channel estimation for a subband full duplex (SBFD) operation; and demodulate a PDSCH scheduled based at least in part on the UE capability.

In some implementations, an apparatus for wireless communication at a network node includes one or more memories and one or more processors, coupled to the one or more memories, configured to: receive an indication of a UE capability for a PDSCH channel estimation for an SBFD operation; and schedule a PDSCH based at least in part on the UE capability.

In some implementations, a method of wireless communication performed by a UE includes transmitting an indication of a UE capability for a PDSCH channel estimation for an SBFD operation; and demodulating a PDSCH scheduled based at least in part on the UE capability.

In some implementations, a method of wireless communication performed by a network node includes receiving an indication of a UE capability for a PDSCH channel estimation for an SBFD operation; and scheduling a PDSCH based at least in part on the UE capability.

In some implementations, a non-transitory computer-readable medium storing a set of instructions for wireless communication includes one or more instructions that, when executed by one or more processors of a UE, cause the UE to: transmit an indication of a UE capability for a PDSCH channel estimation for an SBFD operation; and demodulate a PDSCH scheduled based at least in part on the UE capability.

In some implementations, a non-transitory computer-readable medium storing a set of instructions for wireless communication includes one or more instructions that, when executed by one or more processors of a network node, cause the network node to: receive an indication of a UE capability for a PDSCH channel estimation for an SBFD operation; and schedule a PDSCH based at least in part on the UE capability.

In some implementations, an apparatus for wireless communication includes means for transmitting an indication of an apparatus capability for a PDSCH channel estimation for an SBFD operation; and means for demodulating a PDSCH scheduled based at least in part on the apparatus capability.

In some implementations, an apparatus for wireless communication includes means for receiving an indication of a UE capability for a PDSCH channel estimation for an SBFD operation; and means for scheduling a PDSCH based at least in part on the UE capability.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
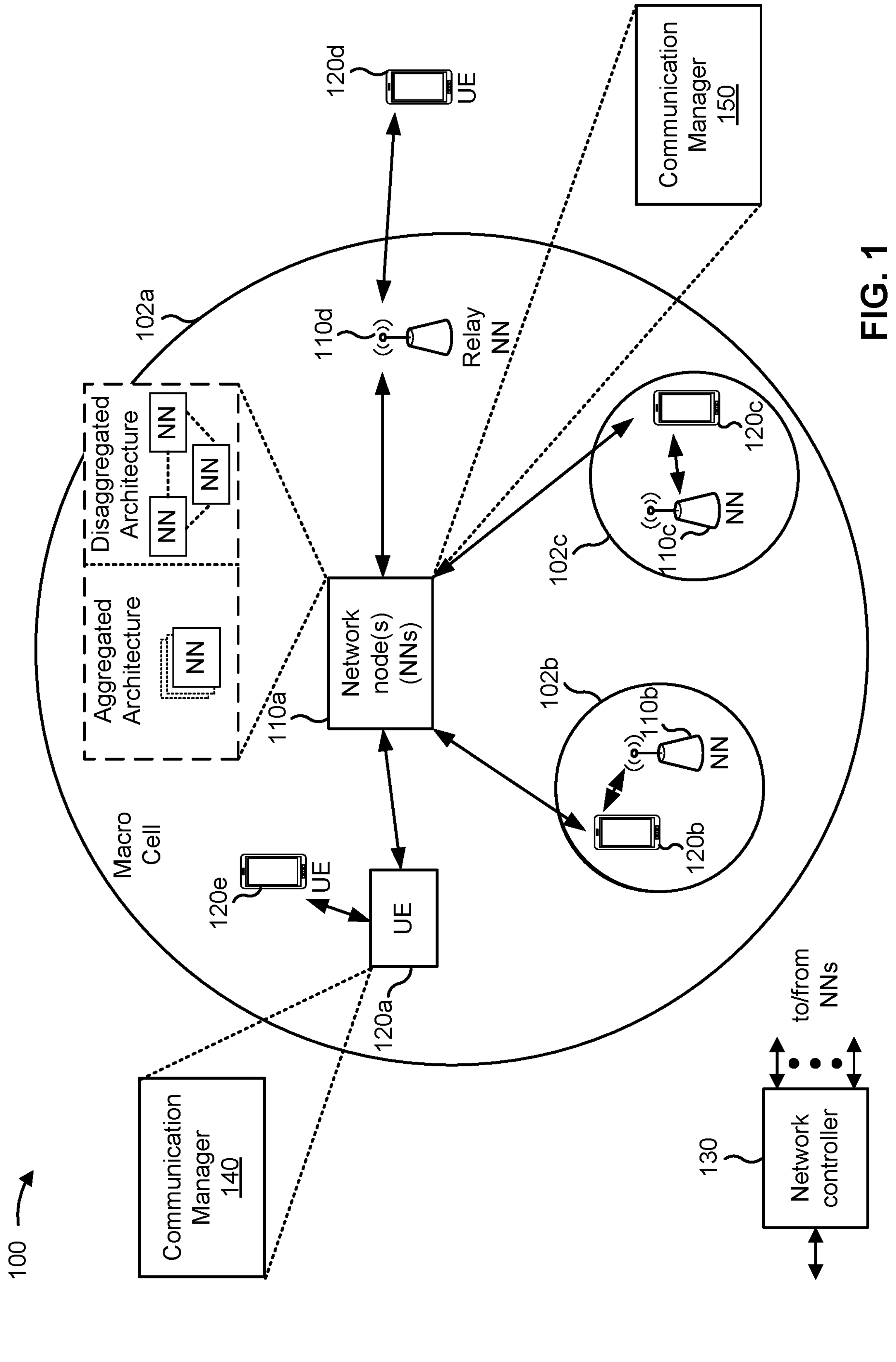
FIG. 1 is a diagram illustrating an example of a wireless network, in accordance with the present disclosure.

A physical downlink shared channel (PDSCH) allocation may span subband full duplex (SBFD) symbols and non-SBFD symbols in a slot. For example, a first seven symbols in the slot may be non-SBFD symbols. A last seven symbols in the slot may be SBFD symbols. A first demodulation reference signal (DMRS) may be associated with one non-SBFD symbol, and a second DMRS may be associated with one SBFD symbol. In this case, a user equipment (UE) may need to handle two different DMRS patterns in a time domain for a channel estimation, which may increase a processing complexity at the UE. A UE capability may or may not support handling the two different DMRS patterns in the time domain for the channel estimation, but the UE capability may not be indicated to a network node, which may prevent the network node from considering the UE capability when allocating the PDSCH for the UE. When a PDSCH allocation by the network node conflicts with the UE capability, a performance of the UE may be degraded.

Various aspects relate generally to UE capabilities for downlink channel estimations. Some aspects more specifically relate to UE capability for downlink channel estimations associated with SBFD operations. In some examples, a UE may transmit, to a network node, an indication of a UE capability for a PDSCH channel estimation for an SBFD operation. In some examples, the UE capability may support two spans of contiguous PDSCH physical resource blocks (PRBs) with a wideband precoding. In some examples, the UE capability may specify a maximum quantity of partial precoding resource block groups (PRGs) with a narrowband precoding for the SBFD operation. In some examples, the UE capability may specify a maximum quantity of partial resource block groups (RBGs) with an active bandwidth part (BWP) associated with the SBFD operation. In some examples, the UE capability may specify a quantity of time domain DMRS patterns for a PDSCH reception. In some examples, the network node may receive, from the UE, the indication of the UE capability. In some examples, the network node may schedule the PDSCH based at least in part on the UE capability. In some examples, the UE may demodulate the PDSCH scheduled based at least in part on the UE capability.

Particular aspects of the subject matter described in this disclosure can be implemented to realize one or more of the following potential advantages. In some examples, by indicating UE capabilities for downlink channel estimations associated with SBFD operations, the described techniques may be used to perform a PDSCH scheduling in accordance with the UE capability. In some examples, since the network node may schedule the PDSCH based at least in part on the UE capability, the UE may be able to handle the PDSCH demodulation, thereby improving a performance of the UE.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110*a*, a network node 110*b*, a network node 110*c*, and a network node 110*d*), a UE 120 or multiple UEs 120 (shown as a UE 120*a*, a UE 120*b*, a UE 120*c*, a UE 120*d*, and a UE 120*c*), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110*a* may be a macro network node for a macro cell 102*a*, the network node 110*b* may be a pico network node for a pico cell 102*b*, and the network node 110*c* may be a femto network node for a femto cell 102*c*. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node **110*d* (e.g., a relay network node) may communicate with the network node 110*a* (e.g., a macro network node) and the UE 120*d* in order to facilitate communication between the network node 110*a* and the UE 120*d*. A network node 110** that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, an unmanned aerial vehicle, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE **120*a* and UE 120*c*) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110**.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHZ) and FR2 (24.25 GHz-52.6 GHz). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHZ-300 GHZ) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHZ-71 GHz), FR4 (52.6 GHz-114.25 GHZ), and FR5 (114.25 GHZ-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHZ, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a UE (e.g., the UE 120) may include a communication manager 140. As described in more detail elsewhere herein, the communication manager 140 may transmit an indication of a UE capability for a PDSCH channel estimation for an SBFD operation; and demodulate a PDSCH scheduled based at least in part on the UE capability. Additionally, or alternatively, the communication manager 140 may perform one or more other operations described herein.

In some aspects, a network node (e.g., the network node 110) may include a communication manager 150. As described in more detail elsewhere herein, the communication manager 150 may receive an indication of a UE capability for a PDSCH channel estimation for an SBFD operation; and schedule a PDSCH based at least in part on the UE capability. Additionally, or alternatively, the communication manager 150 may perform one or more other operations described herein.

As indicated above, FIG. 1 is provided as an example. Other examples may differ from what is described with regard to FIG. 1.

Figure 2:
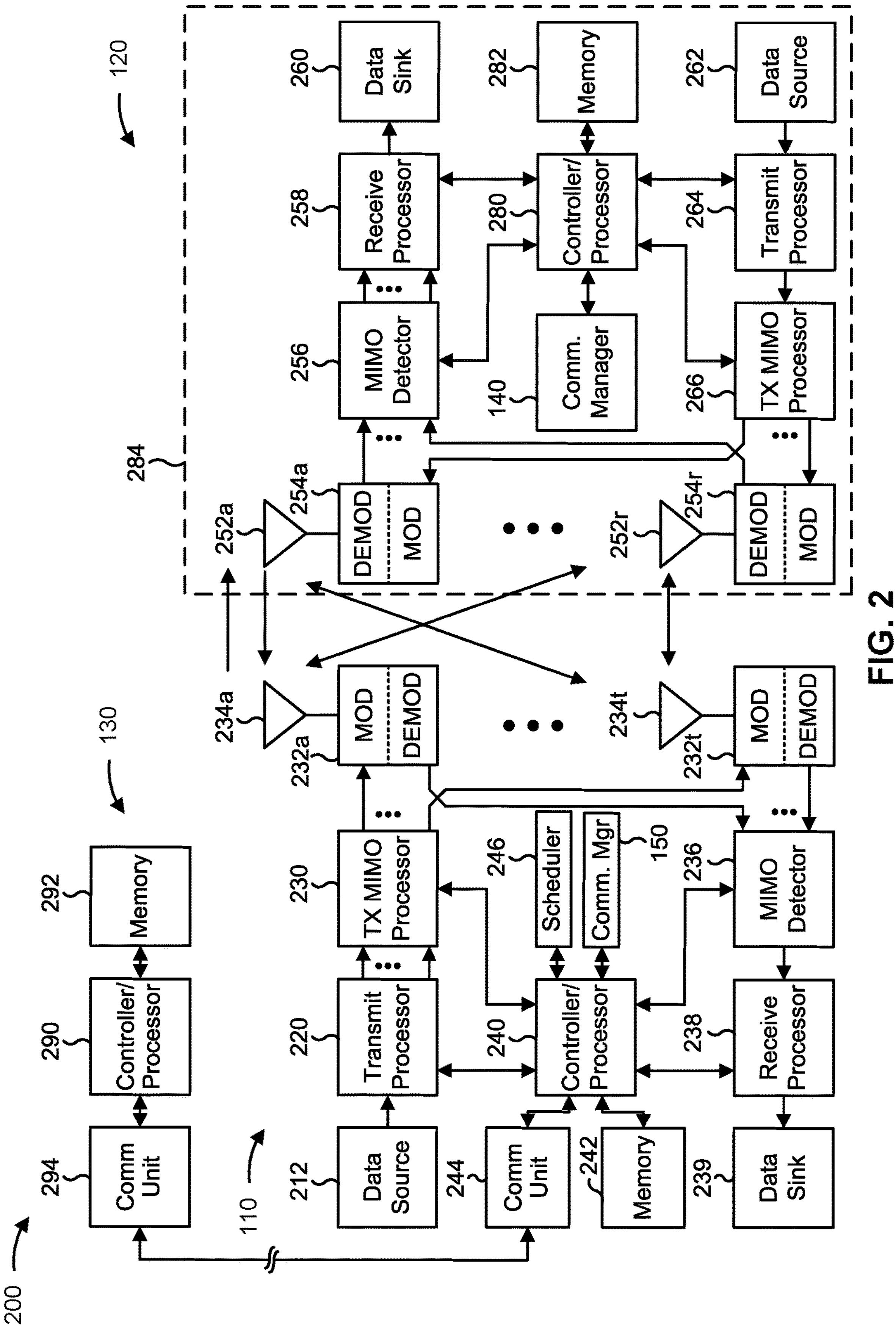
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234*a* through 234*t*, such as T antennas (T≥1). The UE 120 may be equipped with a set of antennas 252*a* through 252*r*, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and May provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a DMRS) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the network node 110 and/or other network nodes 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 9-21).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 9-21).

The controller/processor 240 of the network node 110, the controller/processor 280 of the UE 120, and/or any other component(s) of FIG. 2 may perform one or more techniques associated with UE capabilities for downlink channel estimations associated with SBFD operations, as described in more detail elsewhere herein. For example, the controller/processor 240 of the network node 110, the controller/processor 280 of the UE 120, and/or any other component(s) of FIG. 2 may perform or direct operations of, for example, process 1800 of FIG. 18, process 1900 of FIG. 19, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 1800 of FIG. 18, process 1900 of FIG. 19, and/or other processes as described herein. In some examples, executing instructions may include running the instructions, converting the instructions, compiling the instructions, and/or interpreting the instructions, among other examples.

In some aspects, a UE (e.g., the UE 120) includes means for transmitting an indication of a UE capability for a PDSCH channel estimation for an SBFD operation; and/or means for demodulating a PDSCH scheduled based at least in part on the UE capability. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network node (e.g., the network node) includes means for receiving an indication of a UE capability for a PDSCH channel estimation for an SBFD operation; and/or means for scheduling a PDSCH based at least in part on the UE capability. The means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (CNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. “Network entity” or “network node” may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
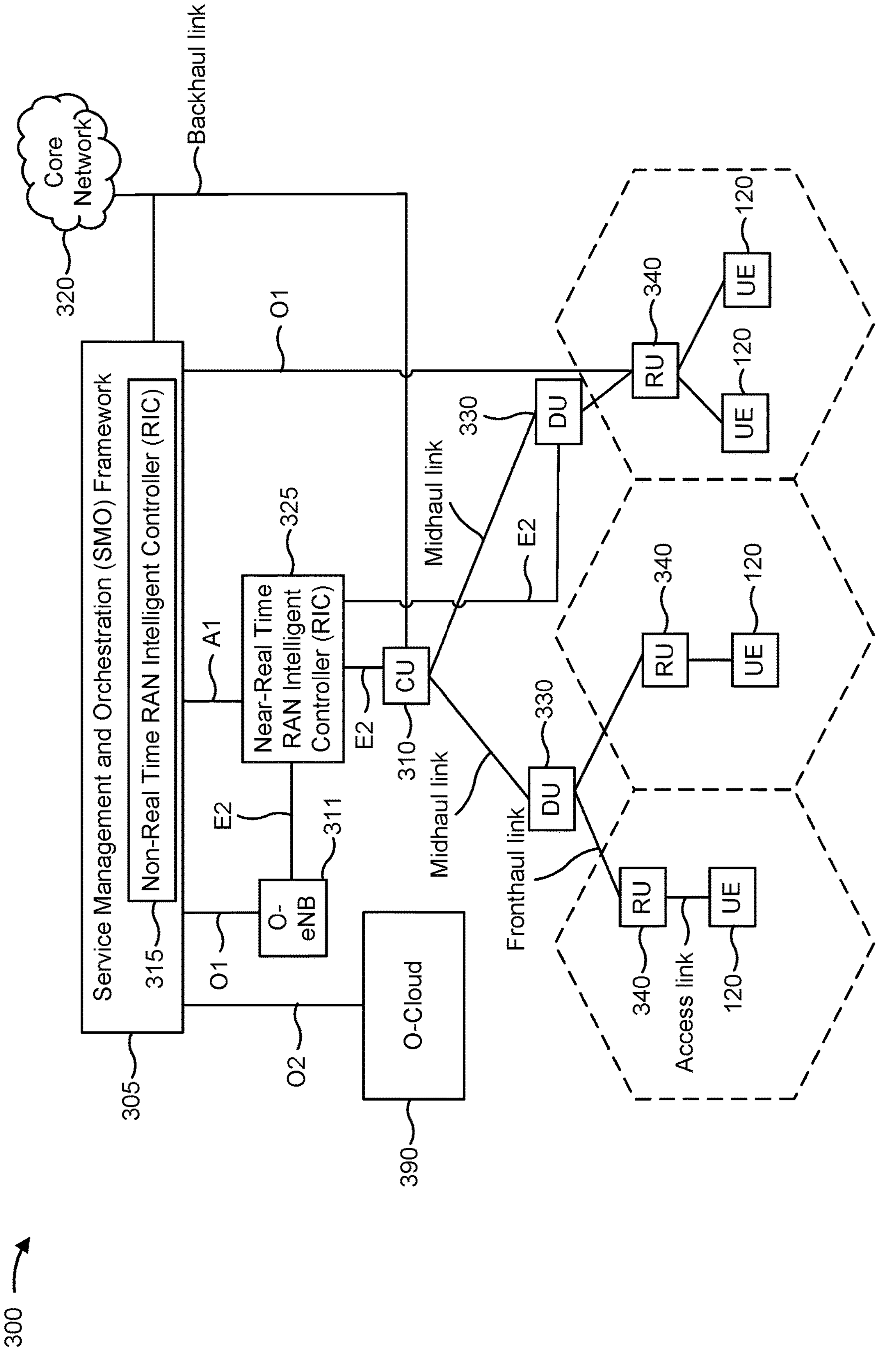
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (IFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

A full duplex (FD) operation may involve an in-band full duplex (IBFD) operation, in which a transmission and a reception may occur on the same time and frequency resource. A downlink direction and an uplink direction may share the same IBFD time/frequency resource based at least in part on a full or partial overlap. Alternatively, the FD operation may involve an SBFD operation (or flexible duplex), in which a transmission and a reception may occur at the same time but on different frequency resources. A downlink resource may be separated from an uplink resource in a frequency domain. In the SBFD operation, no downlink and uplink overlap in frequency may occur.

Figure 4:
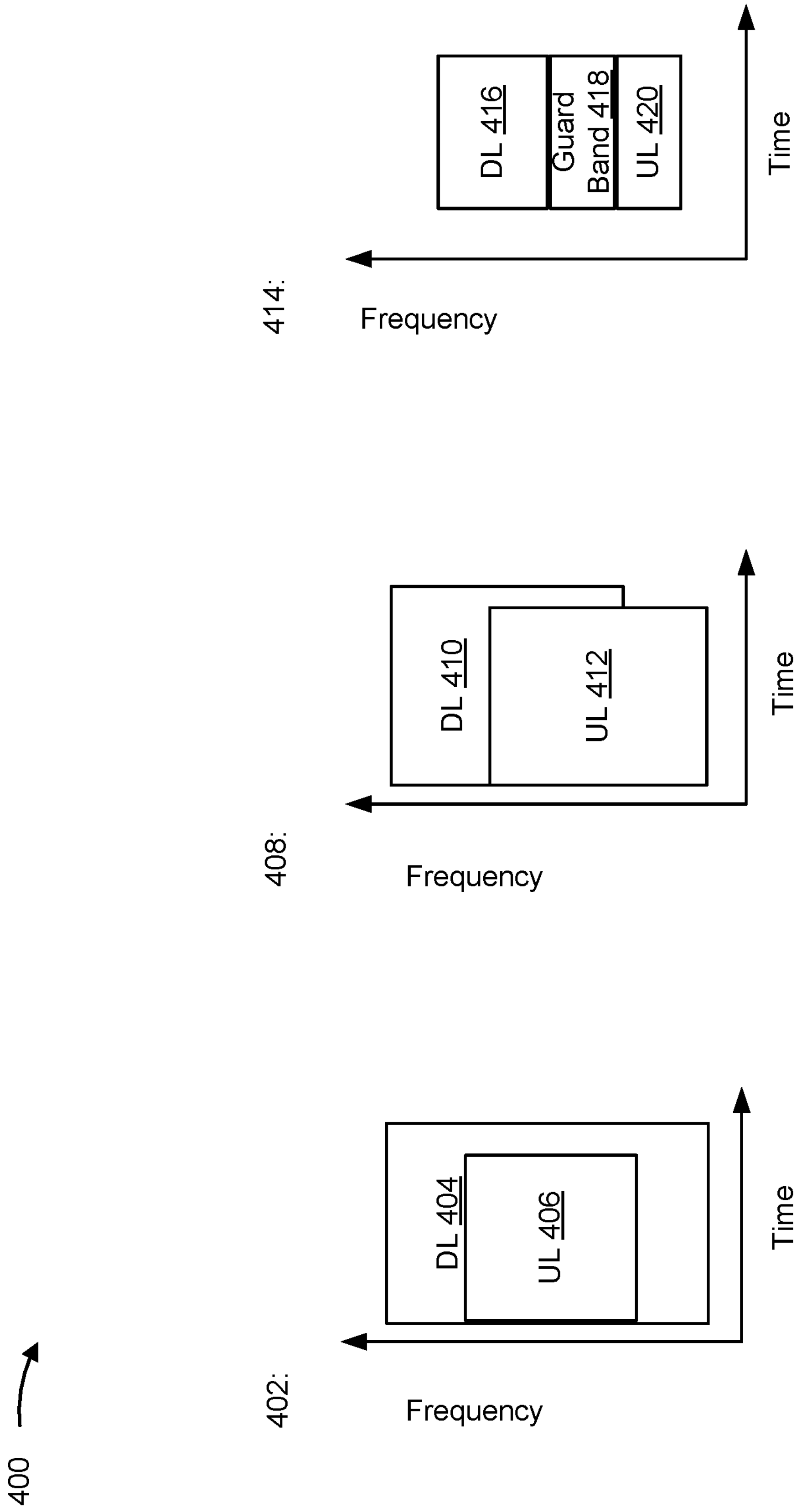
FIG. 4 is a diagram illustrating examples of full duplex (FD) communications, in accordance with the present disclosure.

FIG. 4 is a diagram illustrating examples 400 of FD communications, in accordance with the present disclosure.

As shown by reference number 402, a downlink resource 404 and an uplink resource 406 may share the same IBFD time/frequency resource based at least in part on a full overlap. As shown by reference number 408, a downlink resource 410 and an uplink resource 412 may share the same IBFD time/frequency resource based at least in part on a partial overlap. As shown by reference number 414, a downlink resource 416 and an uplink resource 420 may be associated with a same time but different frequencies. The downlink resource 416 and the uplink resource 420 may be separated by a guard band 418.

As indicated above, FIG. 4 is provided as an example. Other examples may differ from what is described with regard to FIG. 4.

Figure 5:
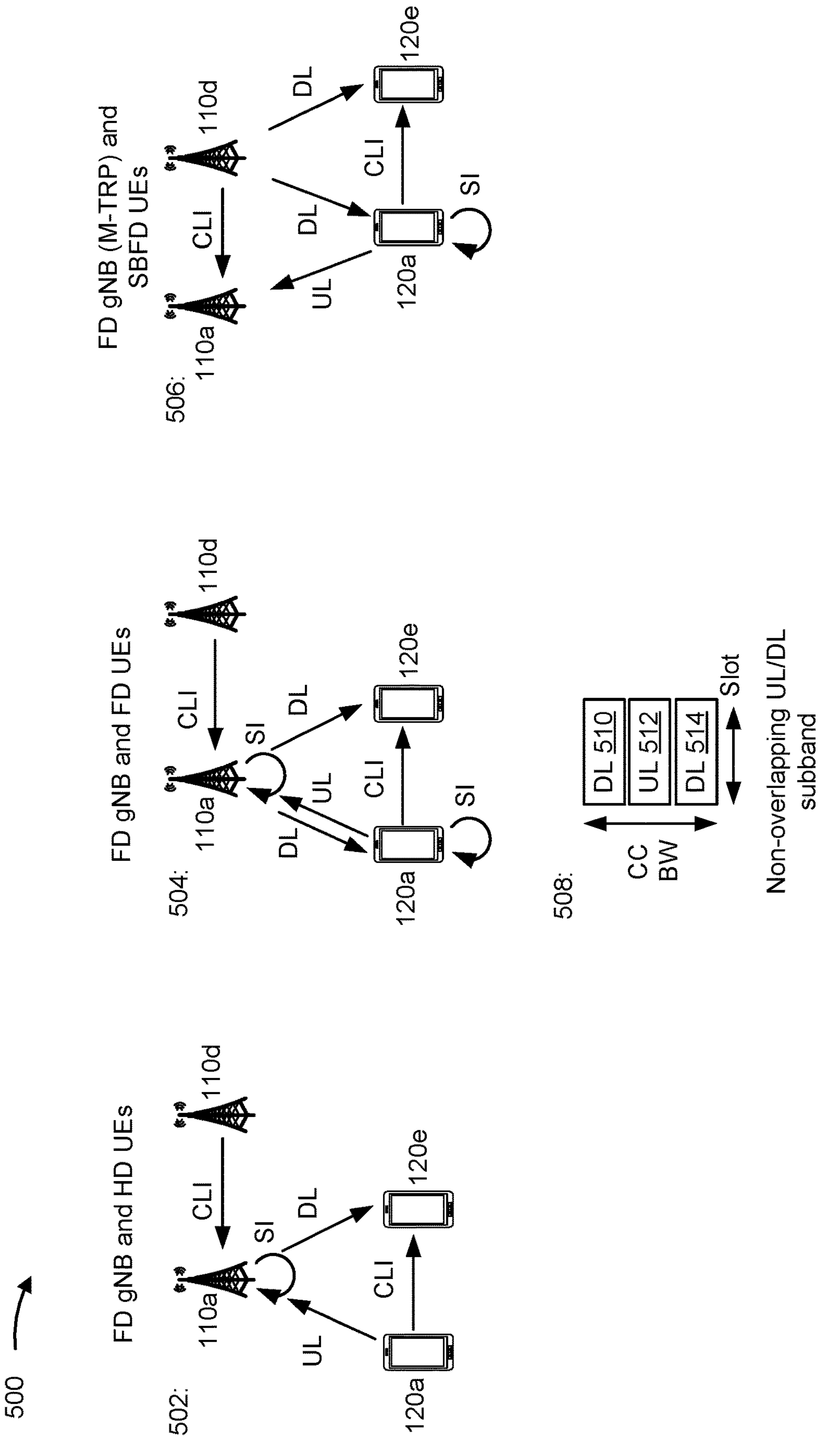
FIG. 5 is a diagram illustrating examples of FD communications, in accordance with the present disclosure.

FIG. 5 is a diagram illustrating examples 500 of FD communications, in accordance with the present disclosure.

As shown by reference number 502, an FD network node (e.g., network node 110*a*) may communicate with half duplex (HD) UEs. The FD network node may be subjected to cross-link interference (CLI) from another FD network node (e.g., network node 110*d*). The CLI from the other FD network node may be inter-network node CLI. The FD network node may experience self-interference (SI). The FD network node may receive an uplink transmission from a first HD UE (e.g., UE 120*a*), and the FD network node may transmit a downlink transmission to a second HD UE (e.g., UE 120*c*). The FD network node may receive the uplink transmission and transmit the downlink transmission on the same slot (e.g., a simultaneous reception/transmission). The second HD UE may be subjected to CLI from the first HD UE (e.g., inter-UE CLI).

As shown by reference number 504, an FD network node (e.g., network node 110*a*) may communicate with FD UEs. The FD network node may be subjected to CLI from another FD network node (e.g., network node 110*d*). The FD network node may experience SI. The FD network node may transmit a downlink transmission to a first FD UE (e.g., UE 120*a*), and the FD network node may receive an uplink transmission from the first FD UE at the same time as the downlink transmission. The FD network node may transmit a downlink transmission to a second FD UE (e.g., UE 120*c*). The second HD UE may be subjected to CLI from the first HD UE. The first UE may experience SI.

As shown by reference number 506, a first FD network node (e.g., network node 110*a*), which may be associated with multiple transmission reception points (TRPs), may communicate with SBFD UEs. The first FD network node may be subjected to CLI from a second FD network node (e.g., network node 110*s*). The first FD network node may receive an uplink transmission from a first SBFD UE (e.g., UE 120*a*). The second FD network node may transmit downlink transmissions to both the first SBFD UE and a second SBFD UE (e.g., UE 120*c*). The second SBFD UE may be subjected to CLI from the first SBFD UE. The first SBFD UE may experience SI.

As shown by reference number 508, an SBFD slot may be associated with a non-overlapping uplink/downlink sub-band. The SBFD slot may be associated with a simultaneous transmission/reception of a downlink/uplink on a sub-band basis at a network node. Within a component carrier bandwidth, an uplink resource 512 may be in between, in a frequency domain, a first downlink resource 510 and a second downlink resource 514. The first downlink resource 510, the second downlink resource 514, and the uplink resource 512 may all be associated with the same time.

An SBFD operation may increase an uplink duty cycle, which may result in a latency reduction (e.g., a downlink signal may be received in uplink-only slots, which may enable latency savings) and uplink coverage improvement. The SBFD operation may improve a system capacity, resource utilization, and/or spectrum efficiency. The SBFD operation may enable a flexible and dynamic uplink/downlink resource adaption according to uplink/downlink traffic in a robust manner.

As indicated above, FIG. 5 is provided as an example. Other examples may differ from what is described with regard to FIG. 5.

A PRG may represent consecutive PRBs in a PDSCH frequency domain resource allocation (FDRA), where the consecutive PRBs may be associated with the same precoding. For an SBFD-aware UE, PRG(s) with a size of two or four may overlap with a subband boundary, and a wideband precoder may be associated with non-contiguous downlink subbands.

Figure 6:
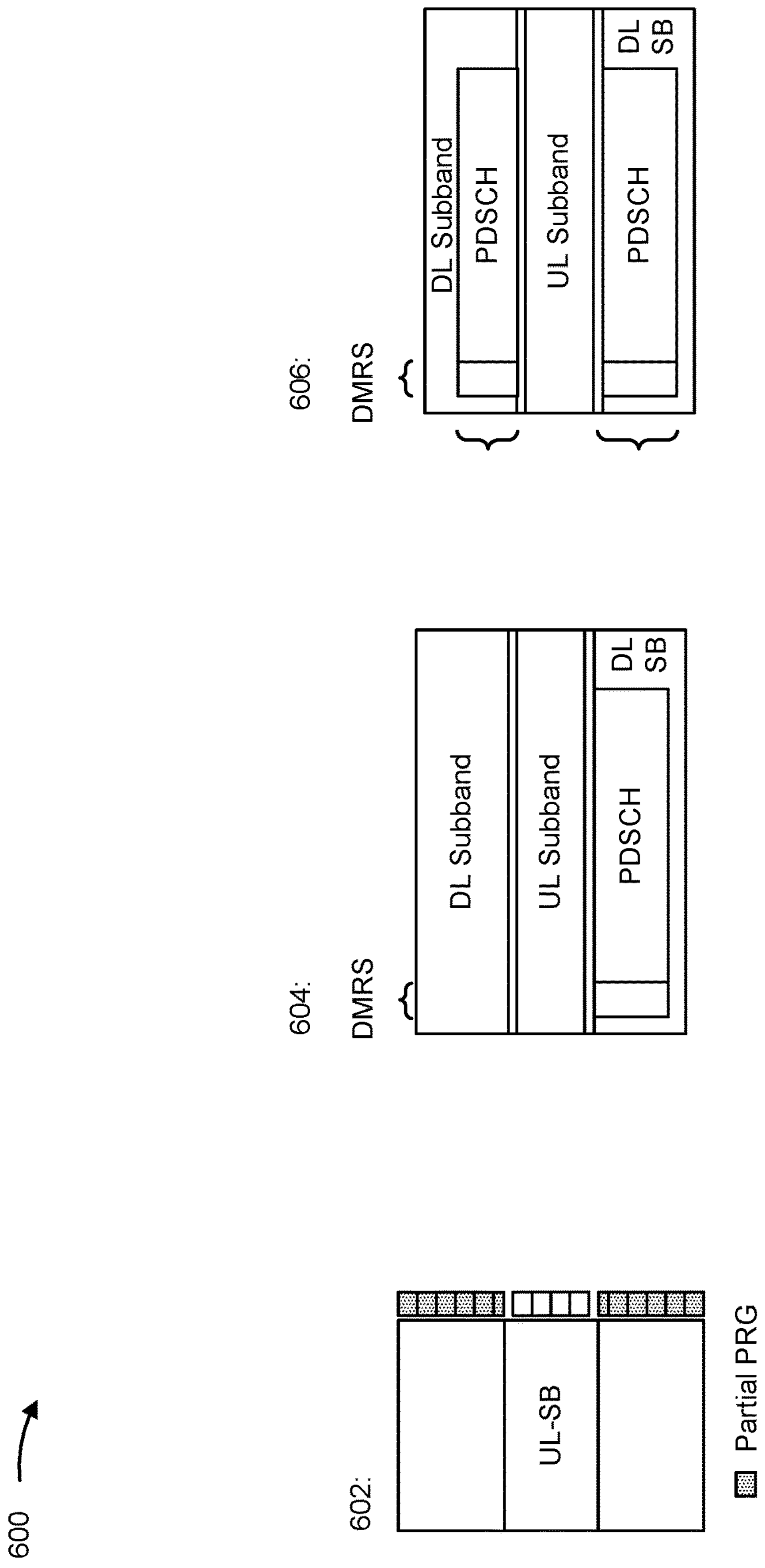
FIG. 6 is a diagram illustrating an example of partial precoding resource block groups (PRGs) in subband full duplex (SBFD), in accordance with the present disclosure.

FIG. 6 is a diagram illustrating an example 600 of partial PRGs in SBFD, in accordance with the present disclosure.

As shown by reference number 602, in a BWP, partial PRGs may be associated with an uplink subband. The partial PRGs may overlap with a boundary of the uplink subband. As shown by reference number 604, a slot may be associated with a first downlink subband, an uplink subband, and a second downlink subband. A PDSCH may be associated with the second downlink subband. Only contiguous PRBs (e.g., single subband scheduling) may occur when wideband DMRS precoding is used. As shown by reference number 606, a slot may be associated with a first downlink subband, an uplink subband, and a second downlink subband. A first PDSCH may be associated with the first downlink subband, and a second PDSCH may be associated with the second downlink subband. A wideband DMRS precoding may occur within each subband.

As indicated above, FIG. 6 is provided as an example. Other examples may differ from what is described with regard to FIG. 6.

A slot may be associated with both SBFD symbols and non-SBFD symbols. A PDSCH time domain resource allocation (TDRA) may include both SBFD symbols and non-SBFD symbols. A slot associated with both SBFD symbols and non-SBFD symbols may be associated with a scheduling flexibility, an implementation complexity, and a compatibility with a legacy time division duplexing (TDD) downlink/uplink configuration.

Figure 7:
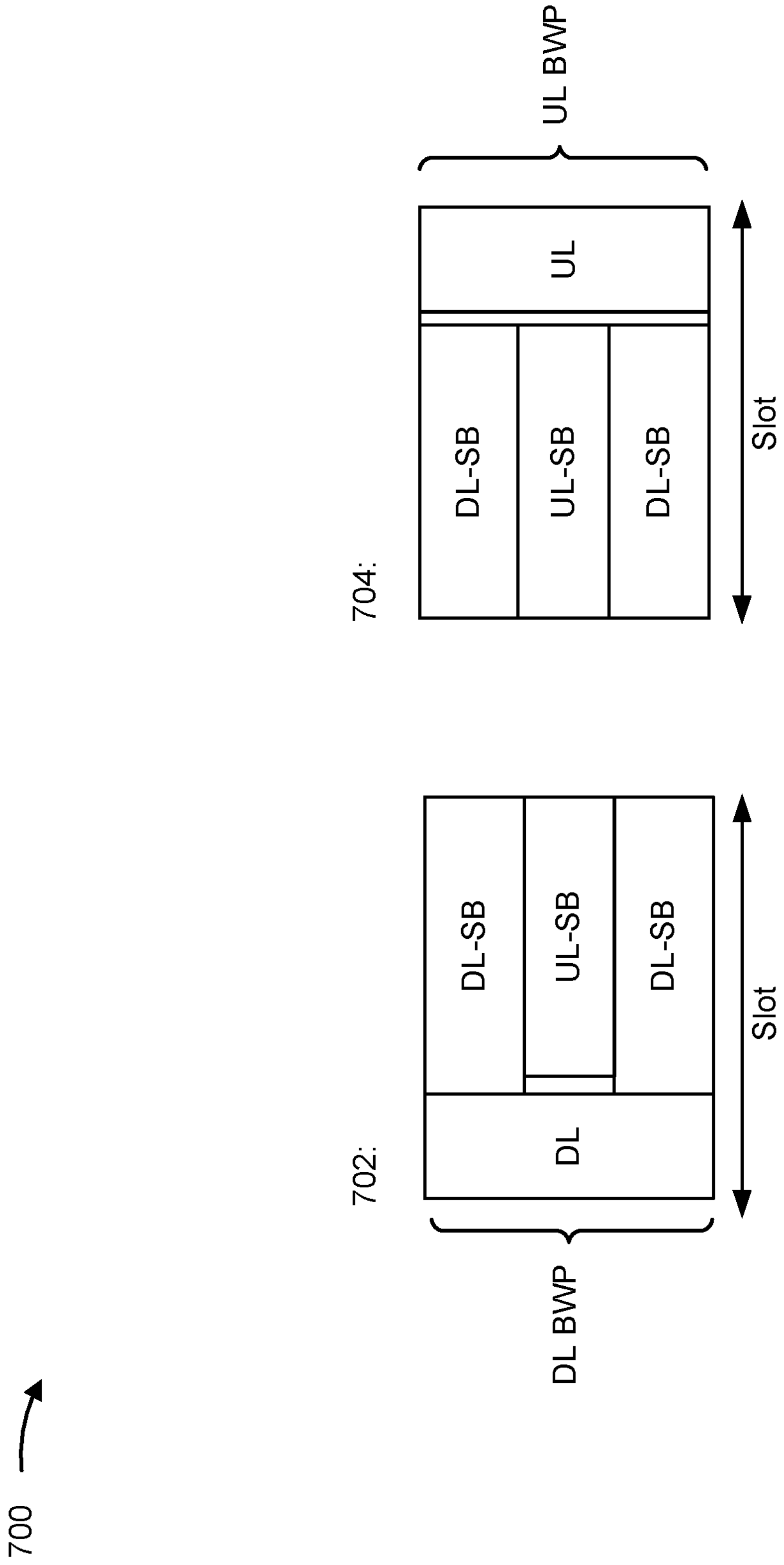
FIG. 7 is a diagram illustrating an example of a slot with SBFD symbols and non-SBFD symbols, in accordance with the present disclosure.

FIG. 7 is a diagram illustrating an example 700 of a slot with SBFD symbols and non-SBFD symbols, in accordance with the present disclosure.

As shown by reference number 702, a slot may include non-SBFD symbols. The non-SBFD symbols may be downlink symbols, which may be associated with a downlink BWP. The slot may also include SBFD symbols. The SBFD symbols may include downlink symbols associated with a first downlink subband, uplink symbols associated with an uplink subband, and downlink symbols associated with a second downlink subband. As shown by reference number 704, a slot may include SBFD symbols. The SBFD symbols may include downlink symbols associated with a first downlink subband, uplink symbols associated with an uplink subband, and downlink symbols associated with a second downlink subband. The slot may also include non-SBFD symbols. The non-SBFD symbols may be uplink symbols, which may be associated with an uplink BWP.

As indicated above, FIG. 7 is provided as an example. Other examples may differ from what is described with regard to FIG. 7.

A PRB bundling may be associated with a precoding granularity, a wideband (WB) precoding (e.g., PRG=WB), and a narrowband precoding (e.g., PRG=2 or 4). For the precoding granularity, a UE may assume that the precoding granularity is $P'_{BWP,i}$ consecutive resource blocks in a frequency domain, and $P'_{BWP,i}$ may be equal to one of the values among {2, 4, wideband}. For the wideband precoding, when $P'_{BWP,i}$ is determined as "wideband", the UE may not expect to be scheduled with non-contiguous PRBs, and the UE may assume that the same precoding is applied to an allocated resource associated with a same transmission configuration indicator (TCI) state or a same quasi colocation (QCL). For the narrowband precoding, the UE may handle only up to two partial PRGs (e.g., when PRG=2 or 4). When $P'_{BWP,i}$ is determined as one of the values among {2, 4}, a PRG may partition a bandwidth part i with $P'_{BWP,i}$ consecutive PRBs. An actual quantity of consecutive PRBs in each PRG may be one or more. When the UE is configured with a nominal RBG size P=2 for the bandwidth part i, or when the UE is configured with an interleaving unit of two for a virtual resource block (VRB)-to-PRB mapping provided by a VRB-to-PRB interleaver (vrb-ToPRB-Interleaver) higher layer parameter given by a PDSCH configuration (PDSCH-Config) for the bandwidth part i, the UE may not be expected to be configured with $P'_{BWP,i}=4$.

A legacy UE capability for partial PRG handling may restrict an FDRA for a PDSCH scheduling in an SBFD slot. With a wideband precoding, a PDSCH allocation in the SBFD slot should be restricted within one downlink subband. With narrowband precoding, the PDSCH allocation in the SBFD slot may have to be aligned with a downlink subband boundary. When the PDSCH allocation spans both SBFD symbols and non-SBFD symbols in a slot, the UE may have to handle two different DMRS patterns in a time domain for channel estimation.

Figure 8:
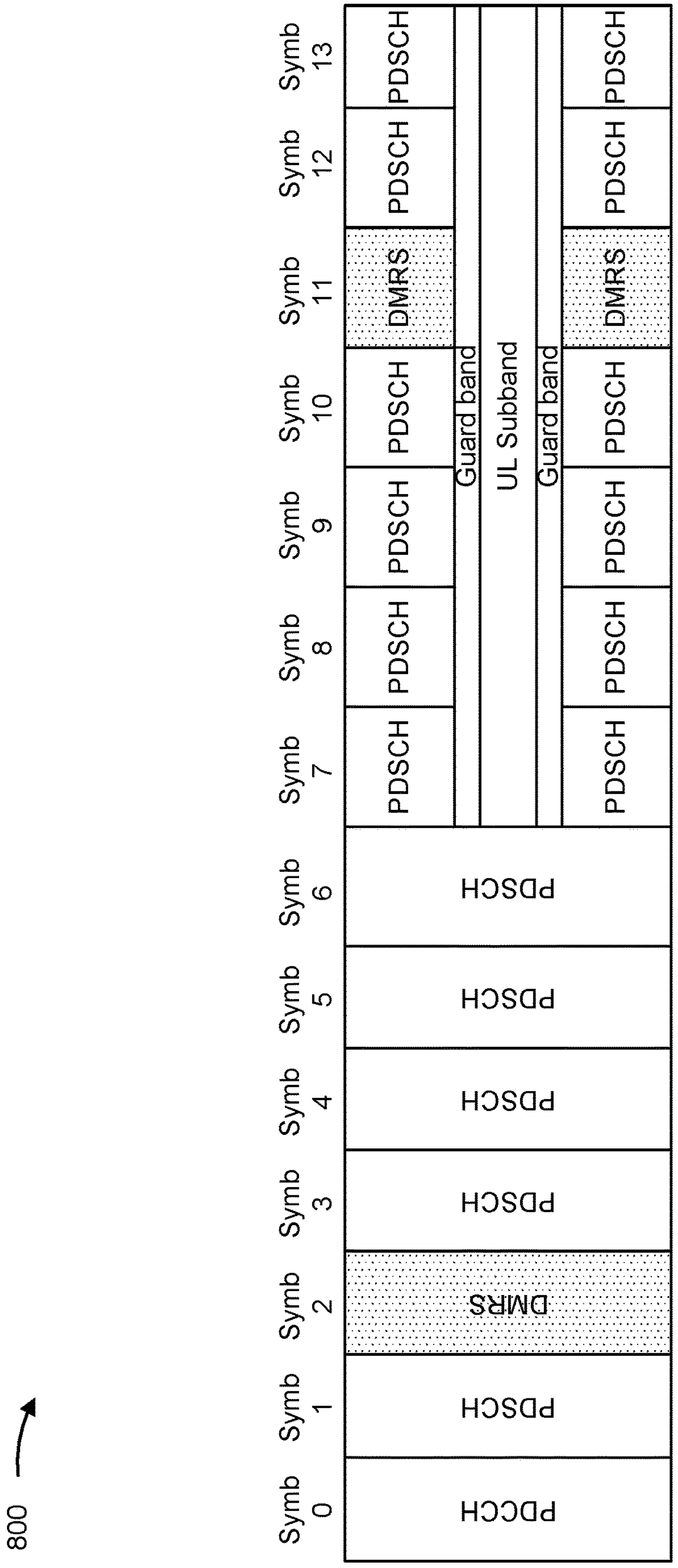
FIG. 8 is a diagram illustrating an example of a physical downlink shared channel allocation that spans SBFD symbols and non-SBFD symbols in a slot, in accordance with the present disclosure.

FIG. 8 is a diagram illustrating an example 800 of a PDSCH allocation that spans SBFD symbols and non-SBFD symbols in a slot, in accordance with the present disclosure.

As shown in FIG. 8, the PDSCH allocation may span the SBFD symbols and the non-SBFD symbols in the slot. A first seven symbols in the slot may be non-SBFD symbols. A last seven symbols in the slot may be SBFD symbols. A first DMRS may be associated with one non-SBFD symbol, and a second DMRS may be associated with one SBFD symbol. In this case, a UE may need to handle two different DMRS patterns in a time domain for a channel estimation, which may increase a processing complexity at the UE. A UE capability may or may not support handling the two different DMRS patterns in the time domain for the channel estimation, but the UE capability may not be indicated to a network node, which may prevent the network node from considering the UE capability when allocating the PDSCH for the UE. When a PDSCH allocation by the network node conflicts with the UE capability, a performance of the UE may be degraded.

As indicated above, FIG. 8 is provided as an example. Other examples may differ from what is described with regard to FIG. 8.

In various aspects of techniques and apparatuses described herein, a UE may transmit, to a network node, an indication of a UE capability for a PDSCH channel estimation for an SBFD operation. The UE capability may support two spans of contiguous PDSCH PRBs with a wideband precoding. The UE capability may specify a maximum quantity of partial PRGs with a narrowband precoding for the SBFD operation. The UE capability may specify a maximum quantity of partial RBGs with an active BWP associated with the SBFD operation. The UE capability may specify a quantity of time domain DMRS patterns for a PDSCH reception. The network node may receive, from the UE, the indication of the UE capability. The network node may schedule the PDSCH based at least in part on the UE capability. The UE may demodulate the PDSCH scheduled based at least in part on the UE capability. Since the network node may schedule the PDSCH based at least in part on the UE capability, the UE may be able to handle the PDSCH demodulation, thereby improving a performance of the UE.

Figure 9:
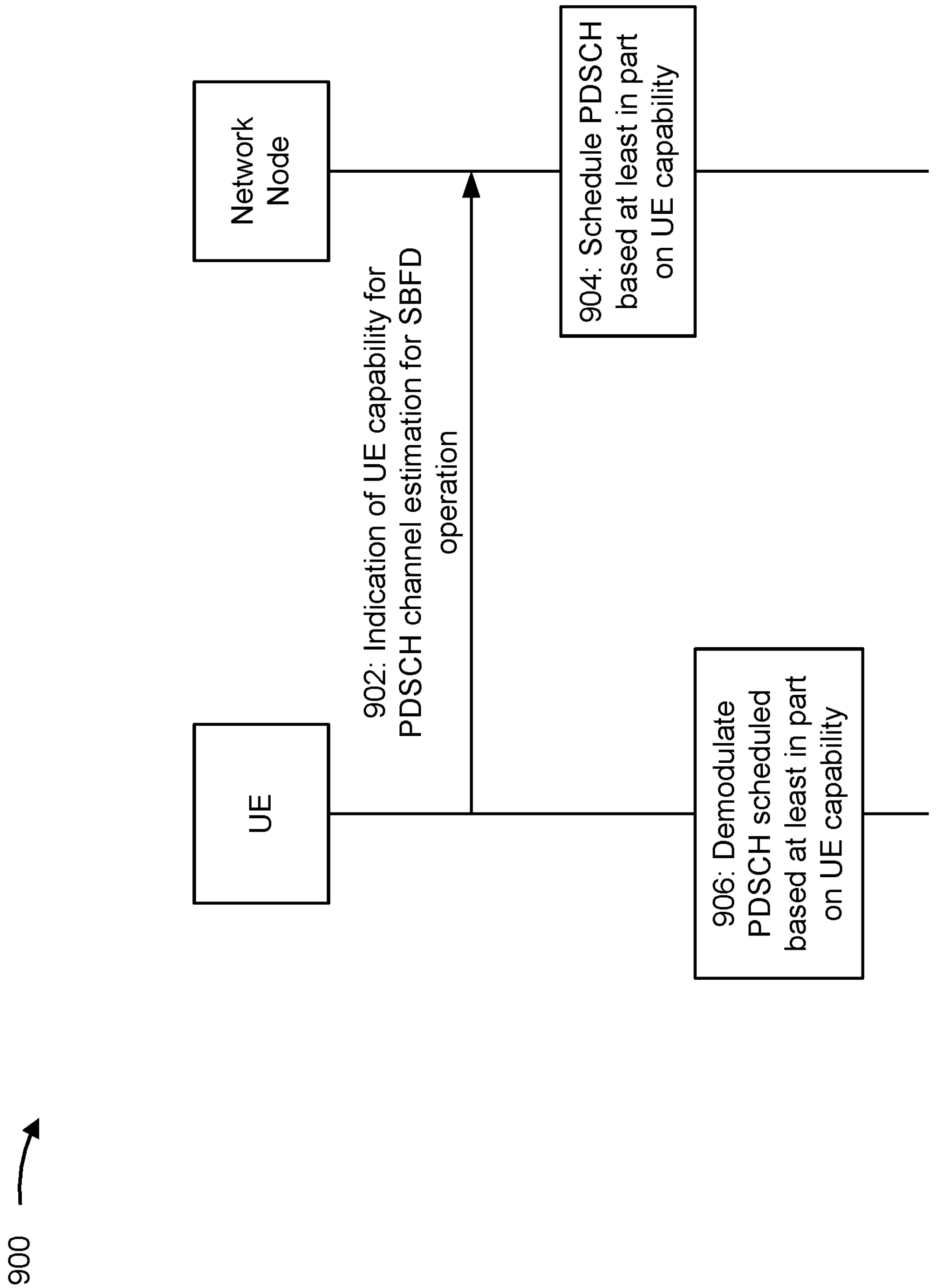
FIGS. 9-17 are diagrams illustrating examples associated with UE capabilities for downlink channel estimations associated with SBFD operations, in accordance with the present disclosure.

FIG. 9 is a diagram illustrating an example 900 associated with UE capabilities for downlink channel estimations associated with SBFD operations, in accordance with the present disclosure. As shown in FIG. 9, example 900 includes communication between a UE (e.g., UE 120) and a network node (e.g., network node 110). In some aspects, the UE and the network node may be included in a wireless network, such as wireless network 100.

As shown by reference number 902, the UE may transmit, to the network node, an indication of a UE capability for a PDSCH channel estimation for an SBFD operation. In some aspects, the UE capability may support two spans of contiguous PDSCH PRBs with a wideband precoding. A PDSCH may be scheduled to span two downlink subbands associated with the SBFD operation, based at least in part on the UE capability. A DMRS signal may be contiguous across the two downlink subbands, or the DMRS may be scheduled to span the two downlink subbands. In some aspects, an RBG bitmap may indicate an FDRA for RBGs in the two downlink subbands, based at least in part on a first type of resource allocation (e.g., a type 0 resource allocation). In some aspects, a resource indicator vector (RIV) may indicate PRBs that span the two downlink subbands, two guard bands, and an uplink subband associated with the SBFD operation, based at least in part on a second type of resource allocation (e.g., a type 1 resource allocation). The PRBs may be dropped from a PDSCH allocation, or the PRBs may be dropped from the PDSCH allocation and from the DMRS. In some aspects, the PDSCH may be scheduled in one downlink subband of the two downlink subbands associated with the SBFD operation, and the PDSCH may be scheduled along with a wideband precoding, based at least in part on the UE capability.

In some aspects, the UE capability for two PRB spans with the wideband precoding may be supported. The UE capability may be specified to support the two spans of contiguous PDSCH PRBs with the wideband precoding (e.g., PRG=WB). When the UE supports such a capability, the network node may schedule the PDSCH that spans both downlink subbands. In some aspects, when the UE does not support this capability, the network node may allocate the PDSCH only in one of the two downlink subbands along with wideband precoding.

Figure 10:
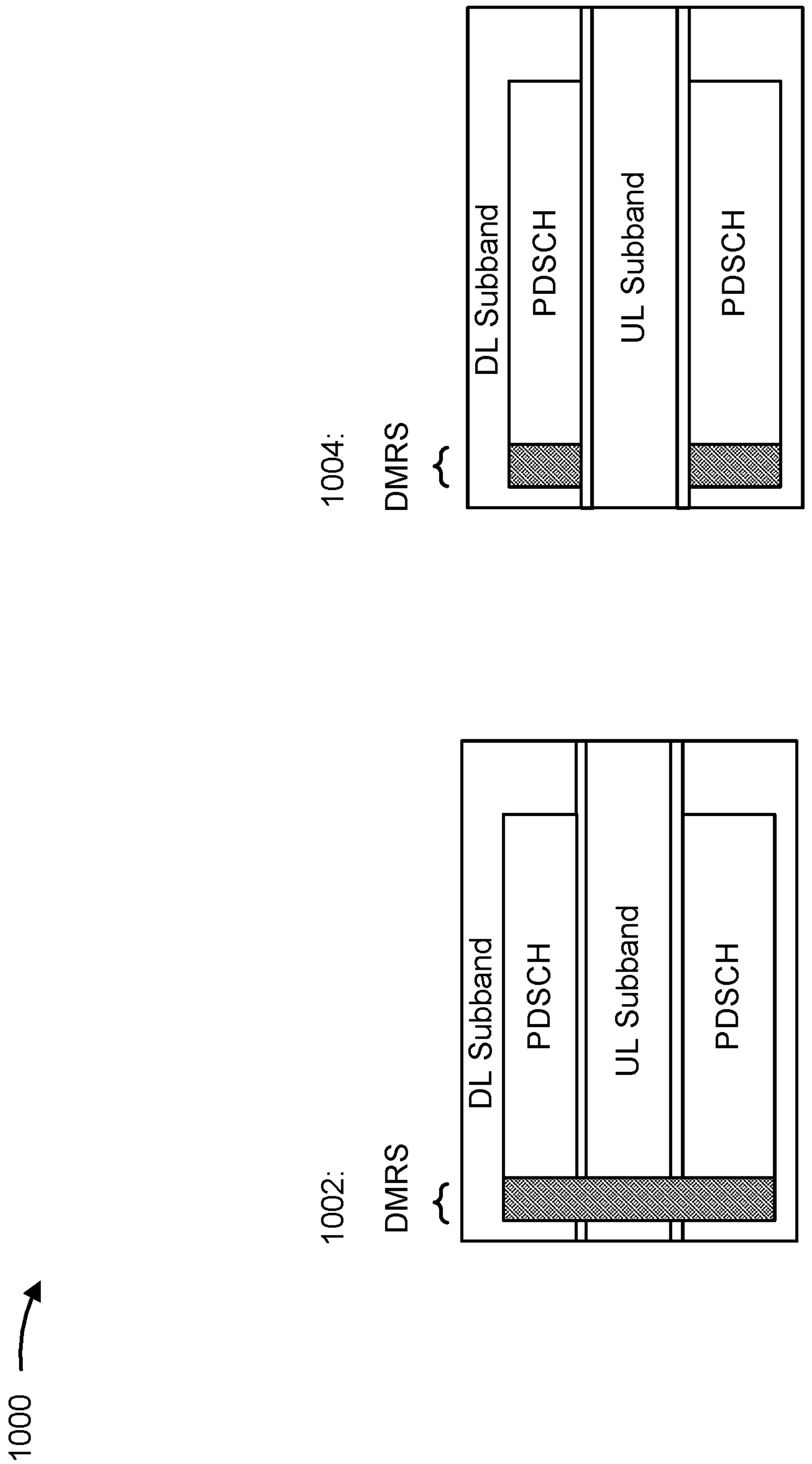

In some aspects, in a first option, the UE may support this capability only for the PDSCH, in which case the DMRS symbol may be contiguous across two downlink subbands (e.g., as shown by reference number 1002 in FIG. 10). In a second option, the UE may support this capability for both data and the DMRS (e.g., as shown by reference number 1004 in FIG. 10). In some aspects, with the type 0 resource allocation, the RBG bitmap may indicate the FDRA for RBGs in both downlink subbands. In the second option, the UE may support this capability for both data and the DMRS. In some aspects, with the type 1 resource allocation, the RIV may indicate PRBs that span two downlinks, guard bands, and the uplink subband. In the first option, PRBs in the guard bands and in the uplink subband may be dropped from the PDSCH allocation. In the second option, PRBs in the guard bands and in the uplink subband may be dropped from the PDSCH allocation and from the DMRS.

Figure 11:
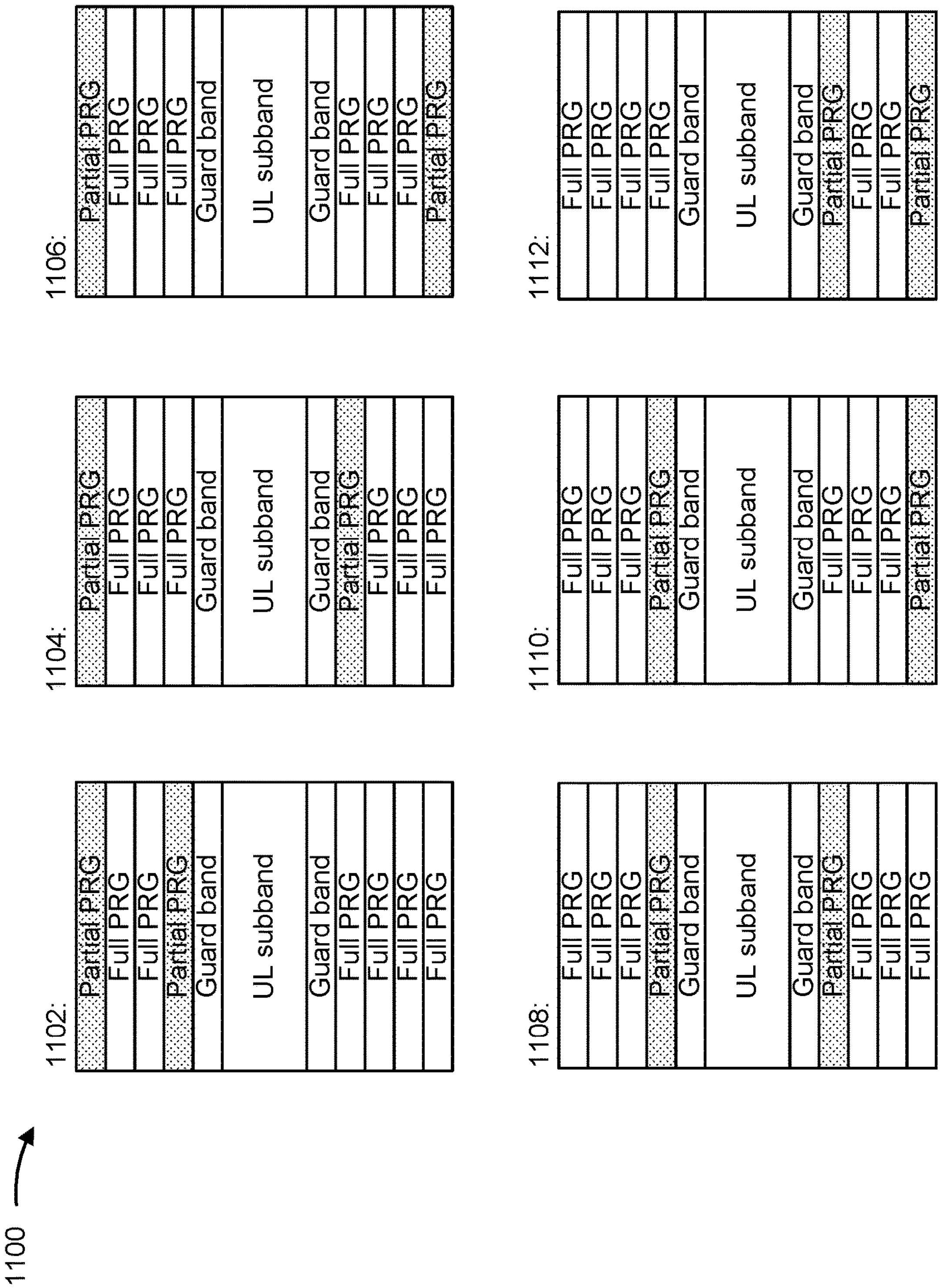
Figure 12:
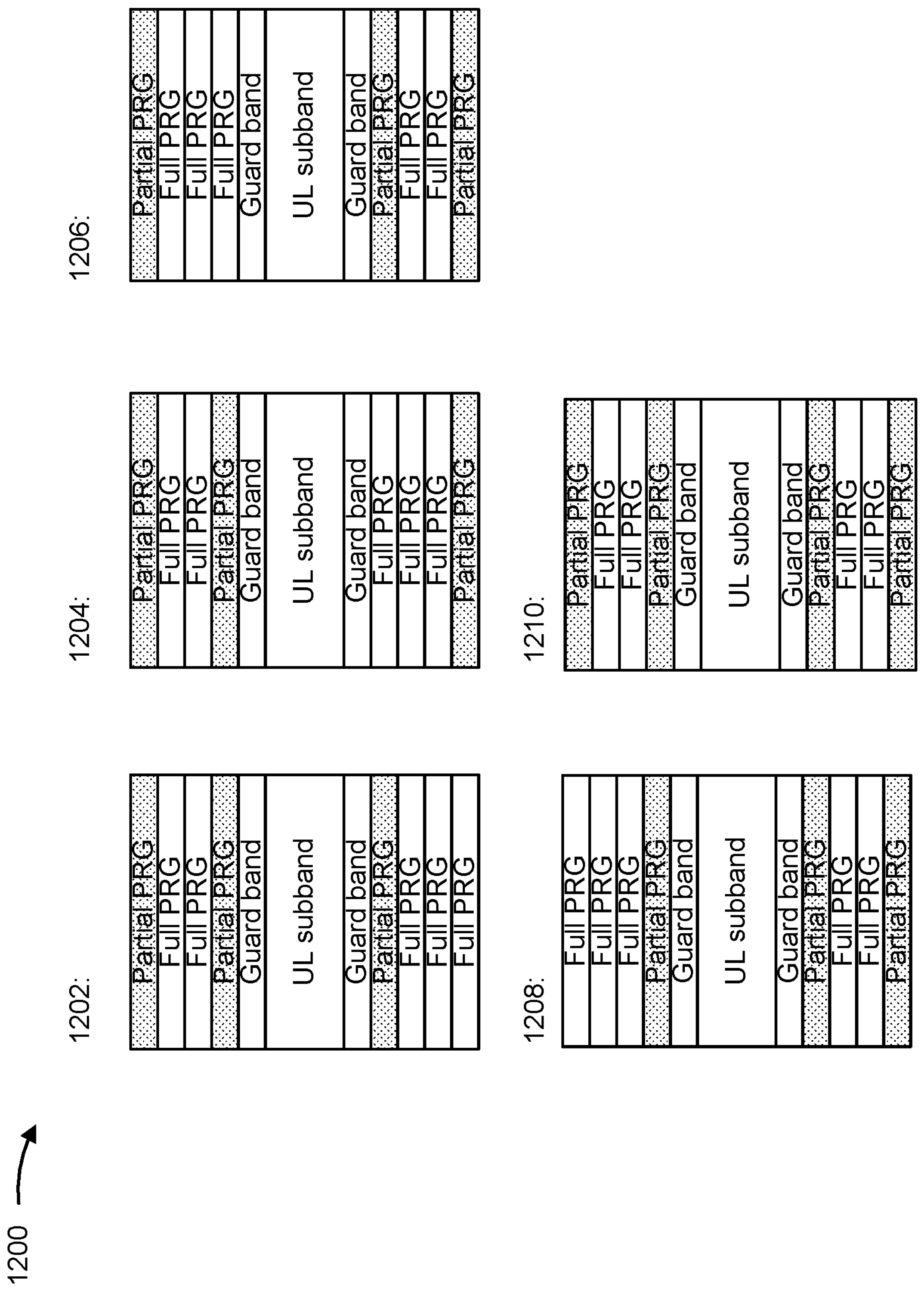

In some aspects, the UE capability may specify a maximum quantity of partial PRGs with a narrowband precoding for the SBFD operation. An allowed FDRA may be based at least in part on the maximum quantity of partial PRGs being equal to two or four, depending on the UE capability. In some aspects, the UE capability for the maximum quantity of partial PRGs may be supported. The UE capability may be specified for the maximum quantity of partial PRBs with narrowband precoding (e.g., PRG=2 or 4). A maximum number of partial PRGs (maxNum-Partial-PRG) may equal 2 or 4, depending on the UE capability. An allowed FDRA may depend on whether the maximum number of partial PRGs is 2 (e.g., as shown in FIG. 11) or 4 (e.g., as shown in FIG. 12)

Figure 13:
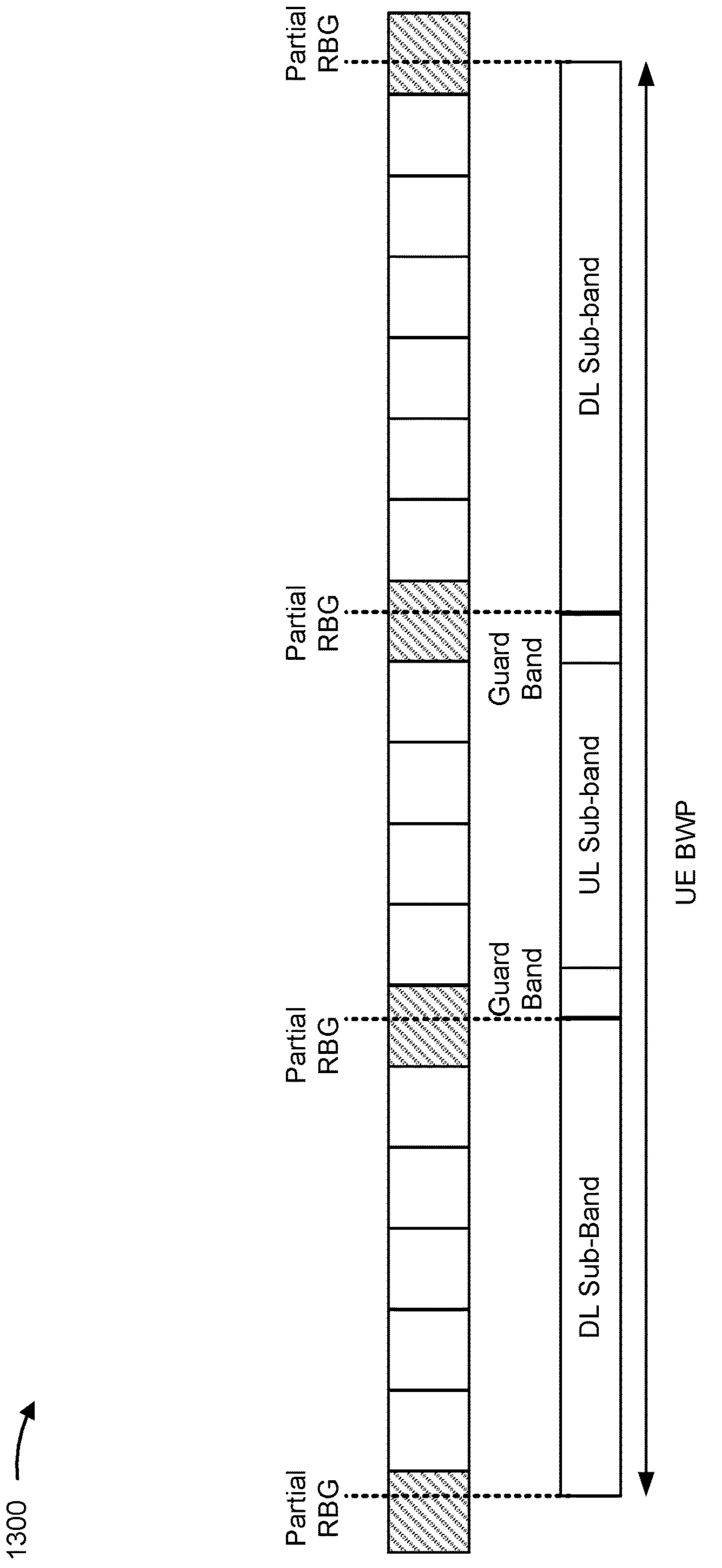

In some aspects, the UE capability may specify a maximum quantity of partial RBGs with an active BWP associated with the SBFD operation. The maximum quantity of partial RBGs may be equal to two or four, depending on the UE capability, and the maximum quantity of partial RBGs may be applicable for the first type of resource allocation. In some aspects, the UE capability for the maximum quantity of partial RBGs may be supported. The UE capability may be specified for the maximum quantity of partial RBGs with the active BWP. A maximum number of partial RBGs (maxNum-Partial-RBG) may equal 2 or 4 (e.g., as shown in FIG. 13), depending on the UE capability. The UE capability for the maximum quantity of partial RBGs with the active BWP may apply to the type 0 resource allocation.

In some aspects, the UE capability may specify a quantity of time domain DMRS patterns for a reception of the PDSCH. The quantity of time domain DMRS patterns may be equal to one or two, depending on the UE capability. In some aspects, an allowed PDSCH allocation and DMRS pattern may be based at least in part on the quantity of time domain DMRS patterns being equal to one, and a TDRA may be based at least in part on non-SBFD symbols and SBFD symbols, and no DMRS may be associated with the SBFD symbols. In some aspects, an allowed PDSCH allocation and DMRS pattern may be based at least in part on the quantity of time domain DMRS patterns being equal to one, and the TDRA may be based at least in part on non-SBFD-only symbols and SBFD-only symbols. In some aspects, an allowed PDSCH allocation and DMRS pattern may be based at least in part on the quantity of time domain DMRS patterns being equal to one, and the TDRA may be based at least in part on non-SBFD symbols, SBFD symbols, and a downlink-subband-only FDRA. In some aspects, an allowed PDSCH allocation and DMRS pattern may be based at least in part on the quantity of time domain DMRS patterns being equal to two, the TDRA may be based at least in part on non-SBFD symbols and SBFD symbols, and DMRS symbols may be associated with the non-SBFD symbols and the SBFD symbols. A same quantity of DMRS ports and a same QCL assumption may be expected between the non-SBFD symbols and the SBFD symbols.

Figure 15:
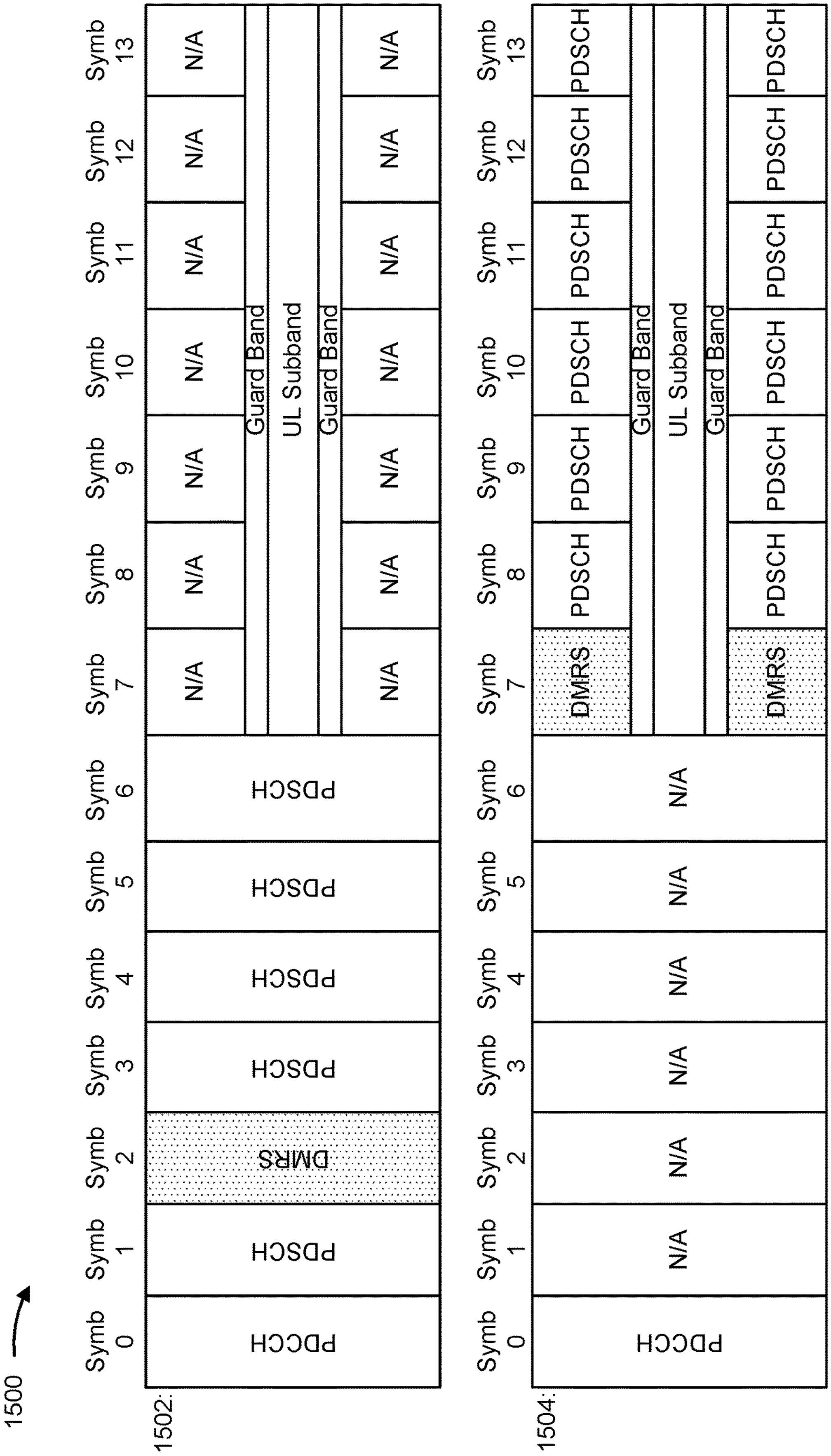
Figure 16:
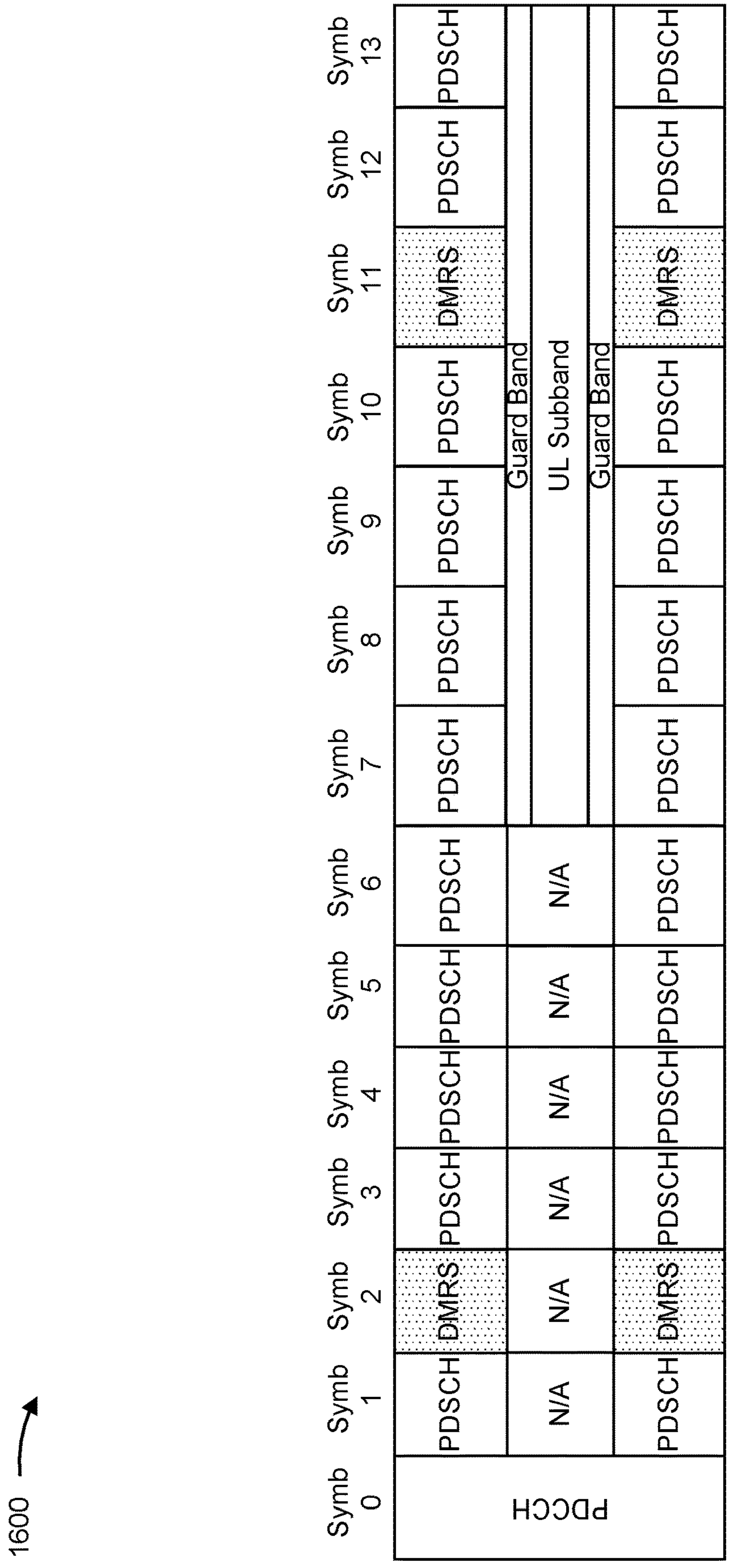
Figure 17:
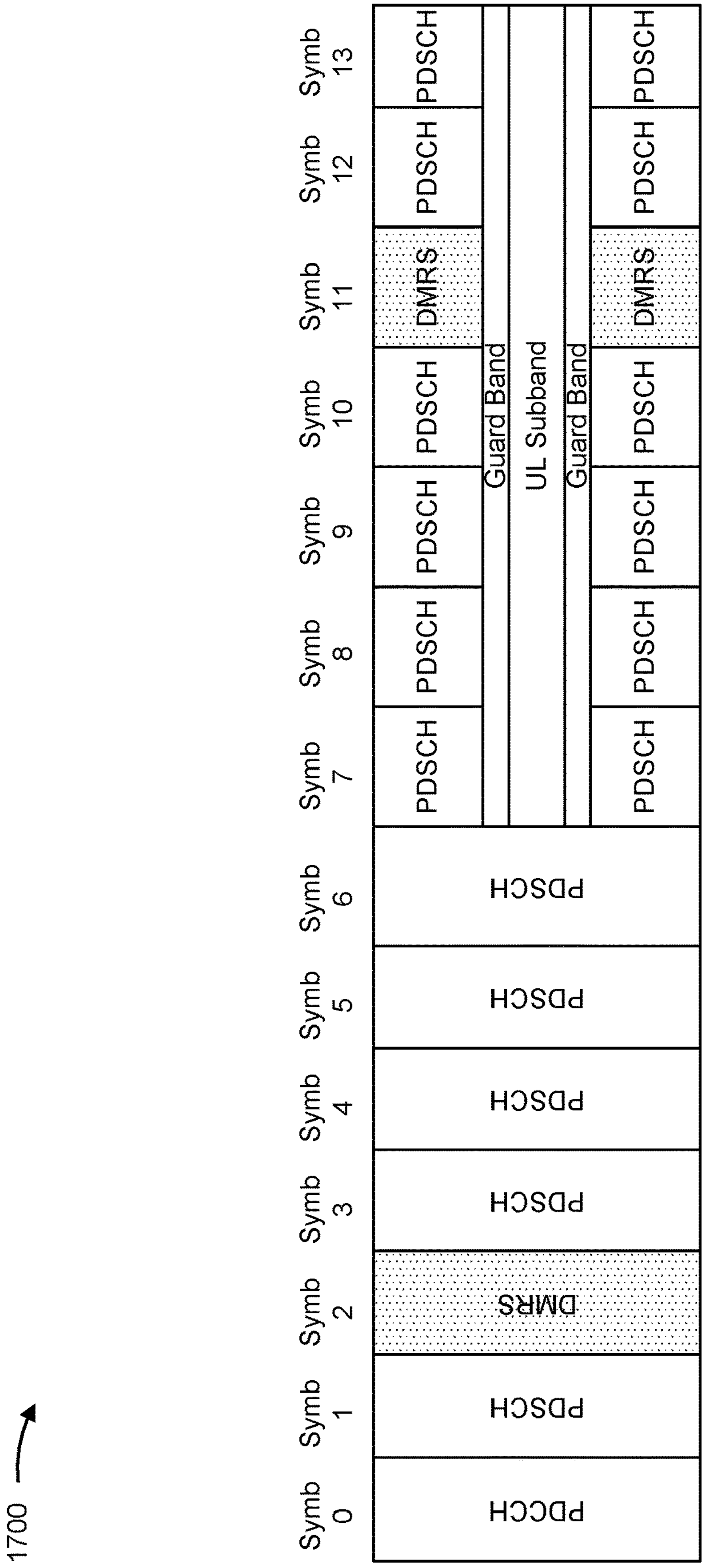

In some aspects, the UE capability for the quantity of time domain DMRS patterns may be supported. The UE capability may be specified for the quantity of time domain DMRS patterns for the PDSCH reception. A number of time domain DMRS patterns (num-TD-DMRS-Patterns) may equal 1 (e.g., as shown in FIGS. 14, 15, and 16) or 2 (e.g., as shown in FIG. 17), depending on the UE capability.

Figure 14:
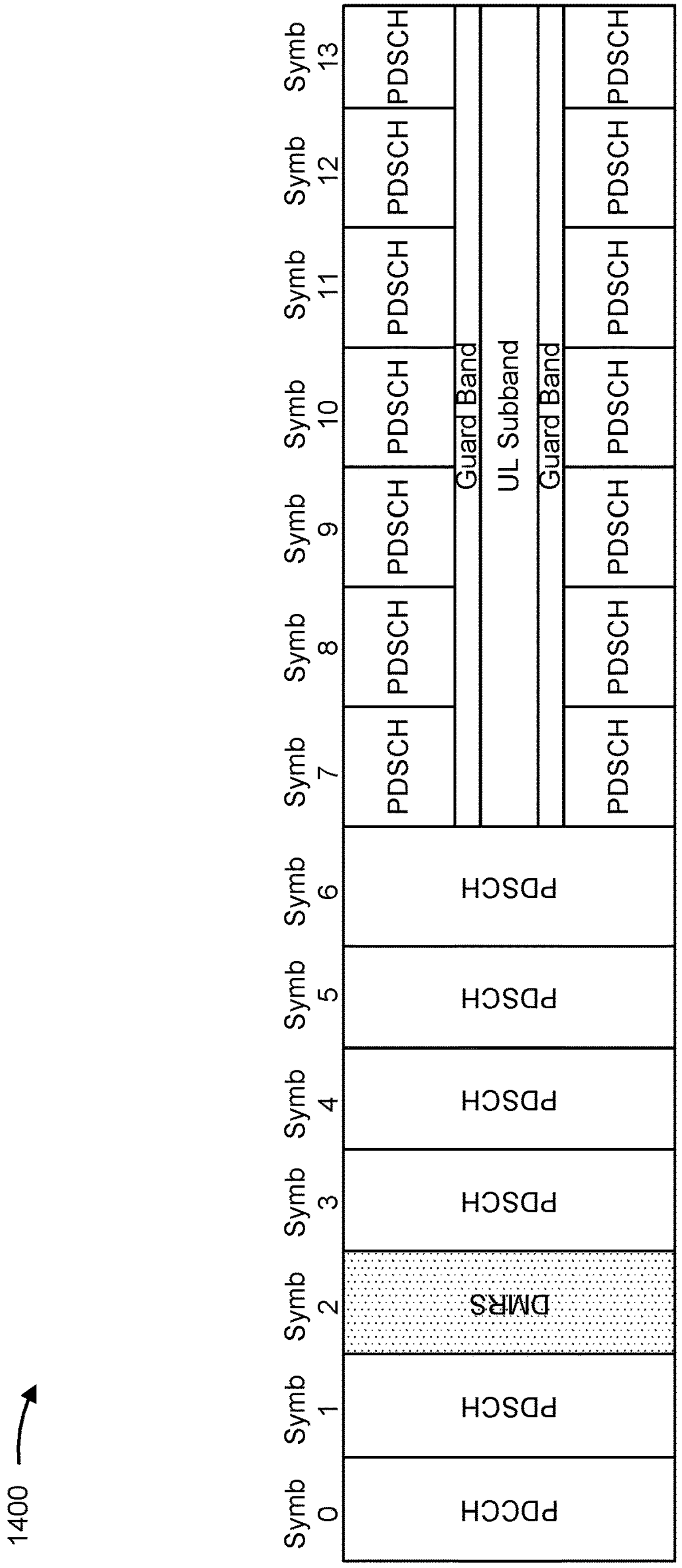

In some aspects, for an allowed PDSCH allocation and DMRS pattern when the number of time domain DMRS patterns is equal to 1, the TDRA may be based at least in part on non-SBFD symbols and SBFD symbols, and based at least in part on no DMRS in the SBFD symbols (e.g., as shown in FIG. 14). In some aspects, for the allowed PDSCH allocation and DMRS pattern when the number of time domain DMRS patterns is equal to 1, the TDRA may be based at least in part on non-SBFD symbols only, or SBFD-only symbols (e.g., as shown in FIG. 15). In some aspects, for the allowed PDSCH allocation and DMRS pattern when the number of time domain DMRS patterns is equal to 1, the TDRA may be based at least in part on non-SBFD symbols and SBFD symbols, and based at least in part on a downlink subband only FDRA (e.g., as shown in FIG. 16). In some aspects, for the allowed PDSCH allocation and DMRS pattern when the number of time domain DMRS patterns is equal to 2, the TDRA may be based at least in part on non-SBFD symbols and SBFD symbols, and based at least in part on DMRS symbols in both non-SBFD symbols and SBFD symbols (e.g., as shown in FIG. 17). Further, the UE may expect the same quantity of DMRS ports in SBFD symbols and non-SBFD symbols, and the UE may expect that the same QCL assumption of DMRS symbol 2 (e.g., a non-SBFD symbol) applies to DMRS symbol 11 (e.g., an SBFD symbol).

As shown by reference number 904, the network node may schedule the PDSCH based at least in part on the UE capability. The network node may schedule the PDSCH based at least in part on the UE capability for the two PRB spans with the wideband precoding. The network node may schedule the PDSCH to span both downlink subbands, based at least in part on the UE capability. The network node may schedule the PDSCH in only one of the two downlink subbands, along with the wideband precoding, based at least in part on the UE capability. The network node may schedule the PDSCH based at least in part on the UE capability for the maximum quantity of partial PRGs with the narrowband precoding. The network node may schedule the PDSCH based at least in part on the UE capability for the maximum quantity of partial RBGs with the active BWP. The network node may schedule the PDSCH based at least in part on the UE capability for the quantity of time domain DMRS patterns for the PDSCH reception.

As shown by reference number 906, the UE may demodulate the PDSCH scheduled based at least in part on the UE capability. The UE may be able to receive the PDSCH because the PDSCH may be scheduled based at least in part on the UE capability. The UE may receive the PDSCH in non-SBFD symbols and in SBFD symbols of the slot. The DMRS may be associated with the non-SBFD symbols and/or the SBFD symbols, depending on the UE capability. As a result, the UE may perform a PDSCH channel estimation in SBFD based at least in part on the UE capability, thereby improving an overall performance of the UE.

As indicated above, FIG. 9 is provided as an example. Other examples may differ from what is described with regard to FIG. 9.

FIG. 10 is a diagram illustrating an example 1000 associated with UE capabilities for downlink channel estimations associated with SBFD operations, in accordance with the present disclosure.

As shown by reference number 1002, a slot may include a first downlink subband, an uplink subband, and a second downlink subband. A PDSCH may be scheduled by a network node to span both the first downlink subband and the second downlink subband. A DMRS may be contiguous across the first downlink subband and the second downlink subband. Further, PRBs in guard bands and in the uplink subband may be dropped from a PDSCH allocation.

As shown by reference number 1004, a slot may include a first downlink subband, an uplink subband, and a second downlink subband. A PDSCH may be scheduled by a network node to span both the first downlink subband and the second downlink subband. A DMRS may be non-contiguous across the first downlink subband and the second downlink subband. Further, PRBs in guard bands and in the uplink subband may be dropped from a PDSCH allocation and from the DMRS.

As indicated above, FIG. 10 is provided as an example. Other examples may differ from what is described with regard to FIG. 10.

FIG. 11 is a diagram illustrating an example 1100 associated with UE capabilities for downlink channel estimations associated with SBFD operations, in accordance with the present disclosure.

In some aspects, a PDSCH allocation may span two downlink subbands in a slot (e.g., an SBFD slot). The slot may also include an uplink subband. A first guard band may separate a first downlink subband and the uplink subband. A second guard band may separate a second downlink subband and the uplink subband. An allowed FDRA may be defined when a maximum number of partial PRGs is equal to two (maxNum-Partial-PRG=2).

As shown by reference number 1102, the first downlink subband may be associated with two partial PRGs, and the second downlink subband may be associated with zero partial PRGs (e.g., only full PRGs). As shown by reference numbers 1104, 1106, 1108, and 1110, the first downlink subband may be associated with one partial PRG, and the second downlink subband may be associated with one partial PRG. As shown by reference number 1112, the first downlink subband may be associated with zero partial PRGs (e.g., only full PRGs), and the second downlink subband may be associated with two partial PRGs.

As indicated above, FIG. 11 is provided as an example. Other examples may differ from what is described with regard to FIG. 11.

FIG. 12 is a diagram illustrating an example 1200 associated with UE capabilities for downlink channel estimations associated with SBFD operations, in accordance with the present disclosure.

In some aspects, a PDSCH allocation may span two downlink subbands in a slot (e.g., an SBFD slot). The slot may also include an uplink subband. A first guard band may separate a first downlink subband and the uplink subband. A second guard band may separate a second downlink subband and the uplink subband. An allowed FDRA may be defined when a maximum number of partial PRGs is equal to two (maxNum-Partial-PRG=4).

As shown by reference numbers 1202 and 1204, the first downlink subband may be associated with two partial PRGs, and the second downlink subband may be associated with one partial PRG. As shown by reference numbers 1206 and 1208, the first downlink subband may be associated with one partial PRG, and the second downlink subband may be associated with two partial PRGs. As shown by reference number 1210, the first downlink subband may be associated with two partial PRGs, and the second downlink subband may be associated with two partial PRGs.

As indicated above, FIG. 12 is provided as an example. Other examples may differ from what is described with regard to FIG. 12.

FIG. 13 is a diagram illustrating an example 1300 associated with UE capabilities for downlink channel estimations associated with SBFD operations, in accordance with the present disclosure.

As shown in FIG. 13, an active BWP (e.g., a UE BWP) may be associated with a first downlink subband, an uplink subband, and a second downlink subband. The active BWP may be associated with four partial RBGs, which may be based at least in part on a UE capability.

As indicated above, FIG. 13 is provided as an example. Other examples may differ from what is described with regard to FIG. 13.

FIG. 14 is a diagram illustrating an example 1400 associated with UE capabilities for downlink channel estimations associated with SBFD operations, in accordance with the present disclosure.

As shown in FIG. 14, for an allowed PDSCH allocation and DMRS pattern when a number of time domain DMRS patterns is equal to 1, a TDRA may be based at least in part on non-SBFD symbols and SBFD symbols, and the TDRA may be based at least in part on no DMRS in the SBFD symbols. In this case, the DMRS may only be associated with a non-SBFD symbol (e.g., symbol 2).

As indicated above, FIG. 14 is provided as an example. Other examples may differ from what is described with regard to FIG. 14.

FIG. 15 is a diagram illustrating an example 1500 associated with UE capabilities for downlink channel estimations associated with SBFD operations, in accordance with the present disclosure.

As shown by reference number 1502, for an allowed PDSCH allocation and DMRS pattern when a number of time domain DMRS patterns is equal to 1, a TDRA may be based at least in part on only non-SBFD symbols. In this case, a DMRS may be associated with a non-SBFD symbol (e.g., symbol 2). The DMRS may not be associated with an SBFD symbol.

As shown by reference number 1504, for the allowed PDSCH allocation and DMRS pattern when the number of time domain DMRS patterns is equal to 1, the TDRA may be based at least in part on SBFD-only symbols. In this case, a DMRS may be associated with an SBFD symbol (e.g., symbol 7). The DMRS may not be associated with a non-SBFD symbol.

As indicated above, FIG. 15 is provided as an example. Other examples may differ from what is described with regard to FIG. 15.

FIG. 16 is a diagram illustrating an example 1600 associated with UE capabilities for downlink channel estimations associated with SBFD operations, in accordance with the present disclosure.

As shown in FIG. 16, for an allowed PDSCH allocation and DMRS pattern when a number of time domain DMRS patterns is equal to 1, a TDRA may be based at least in part on non-SBFD symbols and SBFD symbols, and the TDRA may be based at least in part on a downlink subband only FDRA. In this case, a DMRS may be associated with a non-SBFD symbol (e.g., symbol 2), and a DMRS may be associated with an SBFD symbol (e.g., symbol 11), which may be based at least in part on the downlink subband only FDRA.

As indicated above, FIG. 16 is provided as an example. Other examples may differ from what is described with regard to FIG. 16.

FIG. 17 is a diagram illustrating an example 1700 associated with UE capabilities for downlink channel estimations associated with SBFD operations, in accordance with the present disclosure.

As shown in FIG. 17, for an allowed PDSCH allocation and DMRS pattern when a number of time domain DMRS patterns is equal to 2, a TDRA may be based at least in part on non-SBFD symbols and SBFD symbols, and the TDRA may be based at least in part on DMRS symbols in both non-SBFD symbols and SBFD symbols. In this case, a DMRS may be associated with a non-SBFD symbol (e.g., symbol 2), and a DMRS may be associated with an SBFD symbol (e.g., symbol 11).

As indicated above, FIG. 17 is provided as an example. Other examples may differ from what is described with regard to FIG. 17.

Figure 18:
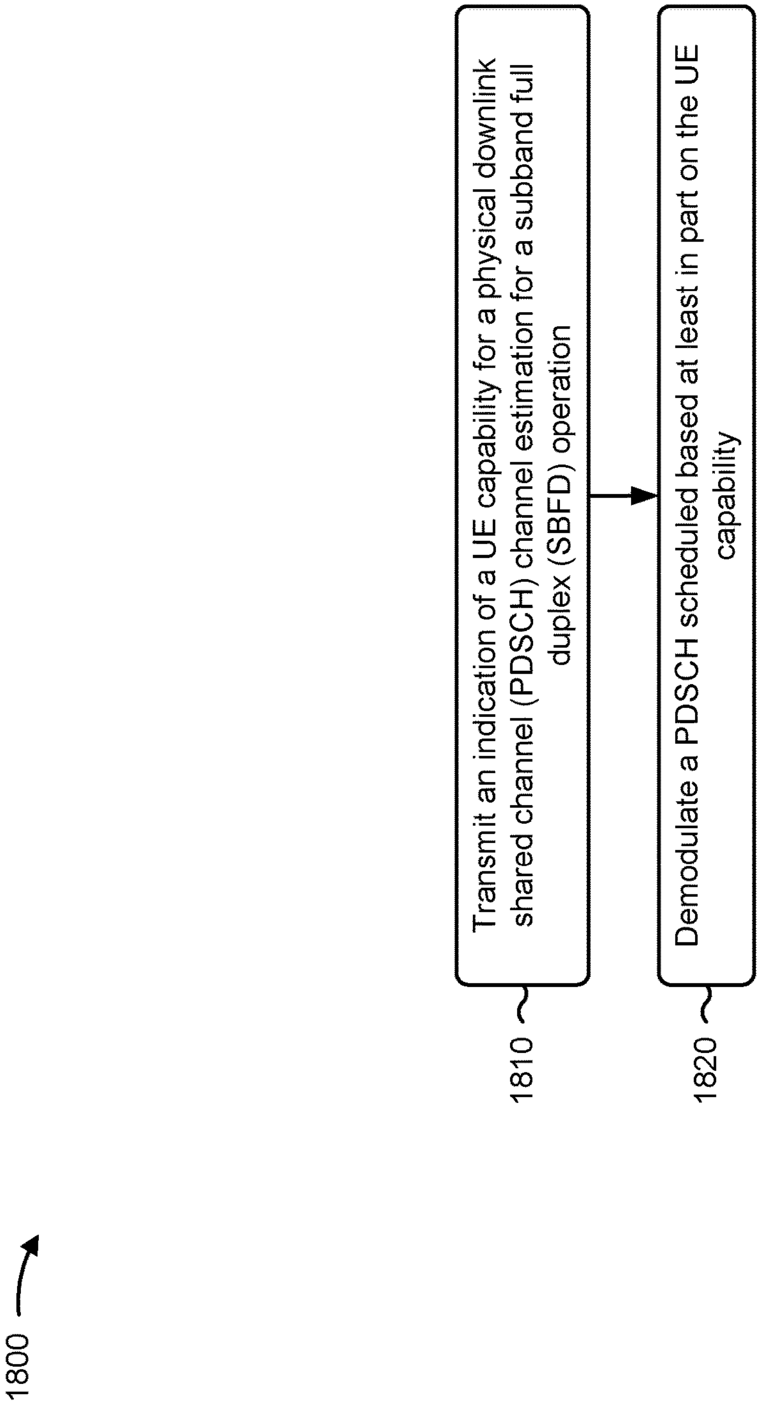
FIGS. 18-19 are diagrams illustrating example processes associated with UE capabilities for downlink channel estimations associated with SBFD operations, in accordance with the present disclosure.

FIG. 18 is a diagram illustrating an example process 1800 performed, for example, by a UE, in accordance with the present disclosure. Example process 1800 is an example where the UE (e.g., UE 120) performs operations associated with UE capabilities for downlink channel estimations associated with SBFD operations.

As shown in FIG. 18, in some aspects, process 1800 may include transmitting an indication of a UE capability for a PDSCH channel estimation for an SBFD operation (block 1810). For example, the UE (e.g., using transmission component 2004 and/or communication manager 2006, depicted in FIG. 20) may transmit an indication of a UE capability for a PDSCH channel estimation for an SBFD operation, as described above.

As further shown in FIG. 18, in some aspects, process 1800 may include demodulating a PDSCH scheduled based at least in part on the UE capability (block 1820). For example, the UE (e.g., using communication manager 2006, depicted in FIG. 20) may demodulate a PDSCH scheduled based at least in part on the UE capability, as described above.

Process 1800 may include additional aspects, such as any single aspect or any combination of aspects described below and/or in connection with one or more other processes described elsewhere herein.

In a first aspect, the UE capability supports two spans of contiguous PDSCH PRBs with a wideband precoding.

In a second aspect, alone or in combination with the first aspect, the PDSCH is scheduled to span two downlink subbands associated with the SBFD operation, based at least in part on the UE capability.

In a third aspect, alone or in combination with one or more of the first and second aspects, a DMRS signal is contiguous across the two downlink subbands.

In a fourth aspect, alone or in combination with one or more of the first through third aspects, a DMRS is scheduled to span the two downlink subbands.

In a fifth aspect, alone or in combination with one or more of the first through fourth aspects, an RBG bitmap indicates an FDRA for RBGs in the two downlink subbands, based at least in part on a first type of resource allocation.

In a sixth aspect, alone or in combination with one or more of the first through fifth aspects, an RIV indicates PRBs that span the two downlink subbands, two guard bands, and an uplink subband associated with the SBFD operation, based at least in part on a second type of resource allocation.

In a seventh aspect, alone or in combination with one or more of the first through sixth aspects, the PRBs are dropped from a PDSCH allocation.

In an eighth aspect, alone or in combination with one or more of the first through seventh aspects, the PRBs are dropped from a PDSCH allocation and from a DMRS.

In a ninth aspect, alone or in combination with one or more of the first through eighth aspects, the PDSCH is scheduled in one downlink subband of two downlink subbands associated with the SBFD operation, and the PDSCH is scheduled along with a wideband precoding, based at least in part on the UE capability.

In a tenth aspect, alone or in combination with one or more of the first through ninth aspects, the UE capability specifies a maximum quantity of partial PRGs with a narrowband precoding for the SBFD operation.

In an eleventh aspect, alone or in combination with one or more of the first through tenth aspects, an allowed FDRA is based at least in part on the maximum quantity of partial PRGs being equal to two or four, depending on the UE capability.

In a twelfth aspect, alone or in combination with one or more of the first through eleventh aspects, the UE capability specifies a maximum quantity of partial RBGs with an active BWP associated with the SBFD operation.

In a thirteenth aspect, alone or in combination with one or more of the first through twelfth aspects, the maximum quantity of partial RBGs is equal to two or four, depending on the UE capability, and the maximum quantity of partial RBGs is applicable for a first type of resource allocation.

In a fourteenth aspect, alone or in combination with one or more of the first through thirteenth aspects, the UE capability specifies a quantity of time domain DMRS patterns for a reception of the PDSCH.

In a fifteenth aspect, alone or in combination with one or more of the first through fourteenth aspects, the quantity of time domain DMRS patterns is equal to one or two, depending on the UE capability.

In a sixteenth aspect, alone or in combination with one or more of the first through fifteenth aspects, an allowed PDSCH allocation and DMRS pattern is based at least in part on the quantity of time domain DMRS patterns being equal to one, and a TDRA is based at least in part on non-SBFD symbols and SBFD symbols, and no DMRS is associated with the SBFD symbols.

In a seventeenth aspect, alone or in combination with one or more of the first through sixteenth aspects, an allowed PDSCH allocation and DMRS pattern is based at least in part on the quantity of time domain DMRS patterns being equal to one, and a TDRA is based at least in part on non-SBFD-only symbols or SBFD-only symbols.

In an eighteenth aspect, alone or in combination with one or more of the first through seventeenth aspects, an allowed PDSCH allocation and DMRS pattern is based at least in part on the quantity of time domain DMRS patterns being equal to one, and a resource allocation is based at least in part on non-SBFD symbols, SBFD symbols, and a downlink-subband-only FDRA.

In a nineteenth aspect, alone or in combination with one or more of the first through eighteenth aspects, an allowed PDSCH allocation and DMRS pattern is based at least in part on the quantity of time domain DMRS patterns being equal to two, and a TDRA is based at least in part on non-SBFD symbols and SBFD symbols, and DMRS symbols are associated with the non-SBFD symbols and the SBFD symbols.

In a twentieth aspect, alone or in combination with one or more of the first through nineteenth aspects, a same quantity of DMRS ports and a same QCL assumption are expected between the non-SBFD symbols and the SBFD symbols.

Although FIG. 18 shows example blocks of process 1800, in some aspects, process 1800 may include additional blocks, fewer blocks, different blocks, or differently arranged blocks than those depicted in FIG. 18. Additionally, or alternatively, two or more of the blocks of process 1800 may be performed in parallel.

Figure 19:
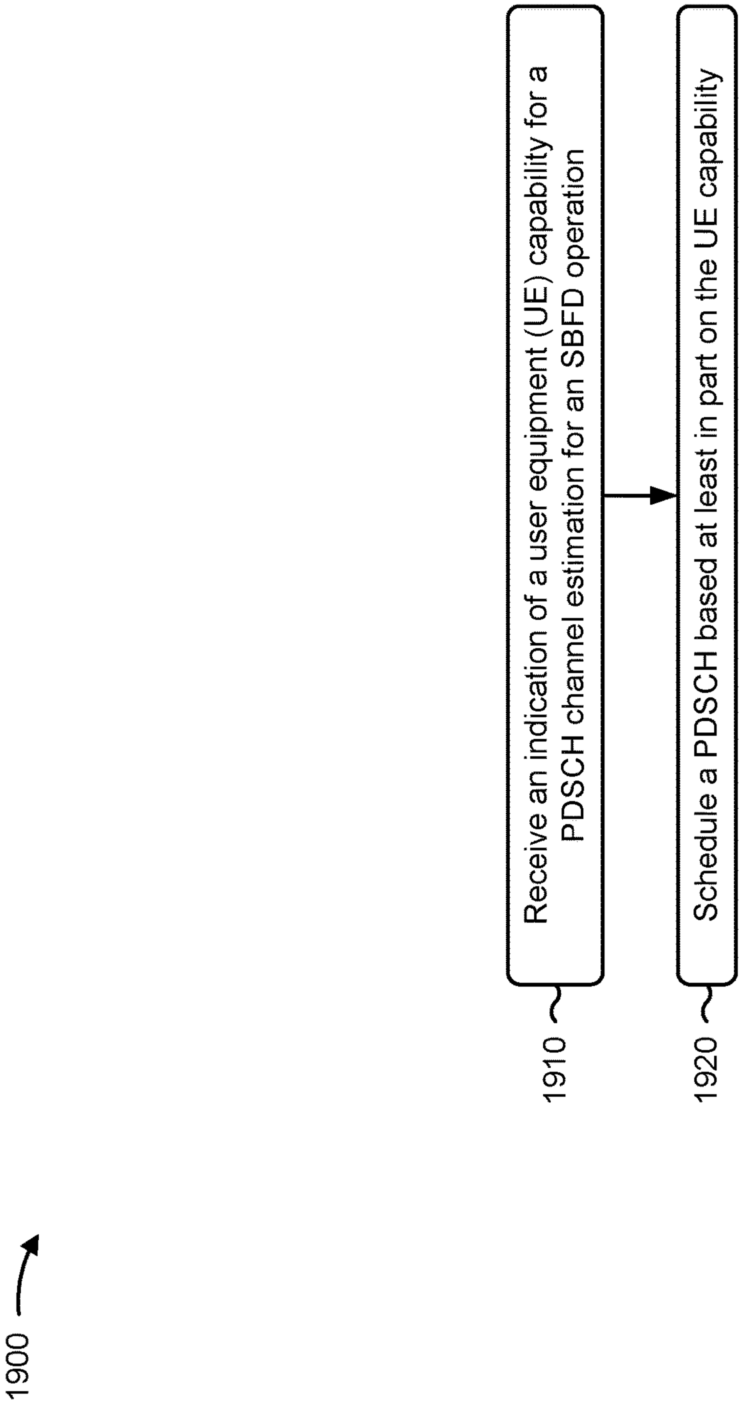

FIG. 19 is a diagram illustrating an example process 1900 performed, for example, by a network node, in accordance with the present disclosure. Example process 1900 is an example where the network node (e.g., network node 110) performs operations associated with UE capabilities for downlink channel estimations associated with SBFD operations.

As shown in FIG. 19, in some aspects, process 1900 may include receiving an indication of a UE capability for a PDSCH channel estimation for an SBFD operation (block 1910). For example, the network node (e.g., using reception component 2102 and/or communication manager 2106, depicted in FIG. 21) may receive an indication of a UE capability for a PDSCH channel estimation for an SBFD operation, as described above.

As further shown in FIG. 19, in some aspects, process 1900 may include scheduling a PDSCH based at least in part on the UE capability (block 1920). For example, the network node (e.g., using communication manager 2106, depicted in FIG. 21) may schedule a PDSCH based at least in part on the UE capability, as described above.

Process 1900 may include additional aspects, such as any single aspect or any combination of aspects described below and/or in connection with one or more other processes described elsewhere herein.

In a first aspect, the UE capability supports two spans of contiguous PDSCH PRBs with a wideband precoding.

In a second aspect, alone or in combination with the first aspect, the PDSCH is scheduled to span two downlink subbands associated with the SBFD operation, based at least in part on the UE capability.

In a third aspect, alone or in combination with one or more of the first and second aspects, a DMRS signal is contiguous across the two downlink subbands.

In a fourth aspect, alone or in combination with one or more of the first through third aspects, a DMRS is scheduled to span the two downlink subbands.

In a fifth aspect, alone or in combination with one or more of the first through fourth aspects, an RBG bitmap indicates an FDRA for RBGs in the two downlink subbands, based at least in part on a first type of resource allocation.

In a sixth aspect, alone or in combination with one or more of the first through fifth aspects, an RIV indicates PRBs that span the two downlink subbands, two guard bands, and an uplink subband associated with the SBFD operation, based at least in part on a second type of resource allocation.

In a seventh aspect, alone or in combination with one or more of the first through sixth aspects, the PRBs are dropped from a PDSCH allocation.

In an eighth aspect, alone or in combination with one or more of the first through seventh aspects, the PRBs are dropped from a PDSCH allocation and from a DMRS.

In a ninth aspect, alone or in combination with one or more of the first through eighth aspects, the PDSCH is scheduled in one downlink subband of two downlink subbands associated with the SBFD operation, and the PDSCH is scheduled along with a wideband precoding, based at least in part on the UE capability.

In a tenth aspect, alone or in combination with one or more of the first through ninth aspects, the UE capability specifies a maximum quantity of partial PRGs with a narrowband precoding for the SBFD operation.

In an eleventh aspect, alone or in combination with one or more of the first through tenth aspects, an allowed FDRA is based at least in part on the maximum quantity of partial PRGs being equal to two or four, depending on the UE capability.

In a twelfth aspect, alone or in combination with one or more of the first through eleventh aspects, the UE capability specifies a maximum quantity of partial RBGs with an active BWP associated with the SBFD operation.

In a thirteenth aspect, alone or in combination with one or more of the first through twelfth aspects, the maximum quantity of partial RBGs is equal to two or four, depending on the UE capability, and the maximum quantity of partial RBGs is applicable for a first type of resource allocation.

In a fourteenth aspect, alone or in combination with one or more of the first through thirteenth aspects, the UE capability specifies a quantity of time domain DMRS patterns for a reception of the PDSCH.

In a fifteenth aspect, alone or in combination with one or more of the first through fourteenth aspects, the quantity of time domain DMRS patterns is equal to one or two, depending on the UE capability.

In a sixteenth aspect, alone or in combination with one or more of the first through fifteenth aspects, an allowed PDSCH allocation and DMRS pattern is based at least in part on the quantity of time domain DMRS patterns being equal to one, and a TDRA is based at least in part on non-SBFD symbols and SBFD symbols, and no DMRS is associated with the SBFD symbols.

In a seventeenth aspect, alone or in combination with one or more of the first through sixteenth aspects, an allowed PDSCH allocation and DMRS pattern is based at least in part on the quantity of time domain DMRS patterns being equal to one, and a TDRA is based at least in part on non-SBFD-only symbols or SBFD-only symbols.

In an eighteenth aspect, alone or in combination with one or more of the first through seventeenth aspects, an allowed PDSCH allocation and DMRS pattern is based at least in part on the quantity of time domain DMRS patterns being equal to one, and a resource allocation is based at least in part on non-SBFD symbols, SBFD symbols, and a downlink-subband-only FDRA.

In a nineteenth aspect, alone or in combination with one or more of the first through eighteenth aspects, an allowed PDSCH allocation and DMRS pattern is based at least in part on the quantity of time domain DMRS patterns being equal to two, and a TDRA is based at least in part on non-SBFD symbols and SBFD symbols, and DMRS symbols are associated with the non-SBFD symbols and the SBFD symbols.

In a twentieth aspect, alone or in combination with one or more of the first through nineteenth aspects, a same quantity of DMRS ports and a same QCL assumption are expected between the non-SBFD symbols and the SBFD symbols.

Although FIG. 19 shows example blocks of process 1900, in some aspects, process 1900 may include additional blocks, fewer blocks, different blocks, or differently arranged blocks than those depicted in FIG. 19. Additionally, or alternatively, two or more of the blocks of process 1900 may be performed in parallel.

Figure 20:
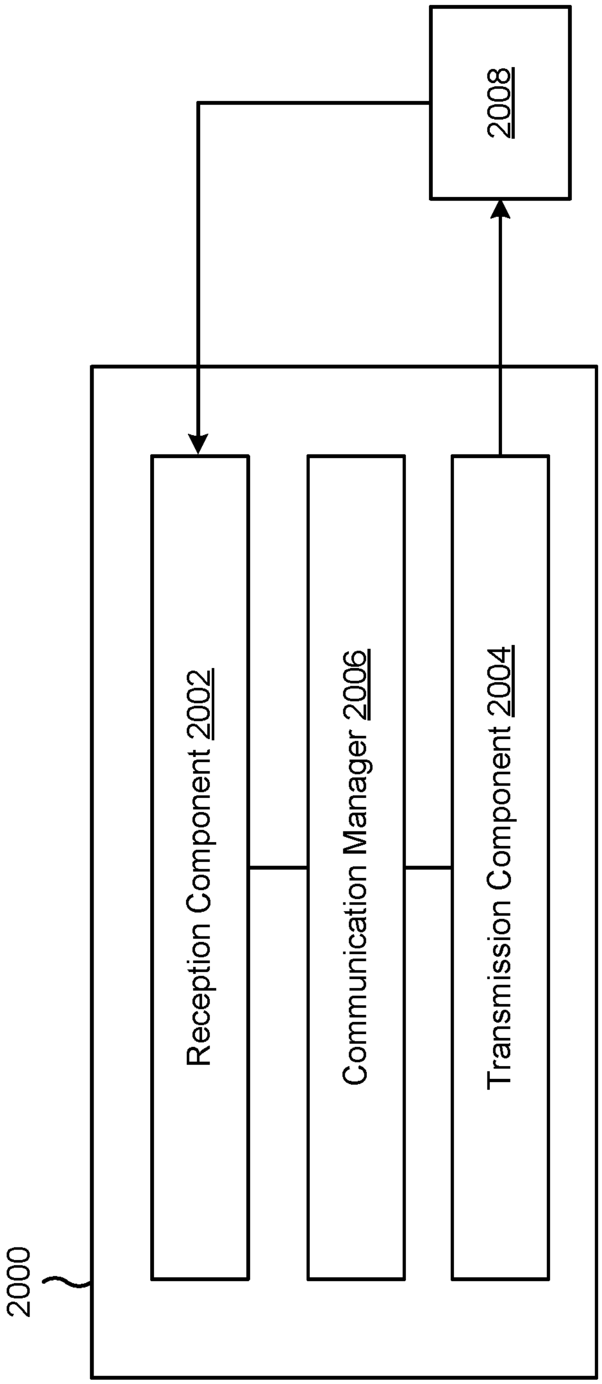
FIGS. 20-21 are diagrams of example apparatuses for wireless communication, in accordance with the present disclosure.

FIG. 20 is a diagram of an example apparatus 2000 for wireless communication, in accordance with the present disclosure. The apparatus 2000 may be a UE, or a UE may include the apparatus 2000. In some aspects, the apparatus 2000 includes a reception component 2002, a transmission component 2004, and/or a communication manager 2006, which may be in communication with one another (for example, via one or more buses and/or one or more other components). In some aspects, the communication manager 2006 is the communication manager 140 described in connection with FIG. 1. As shown, the apparatus 2000 may communicate with another apparatus 2008, such as a UE or a network node (such as a CU, a DU, an RU, or a base station), using the reception component 2002 and the transmission component 2004.

In some aspects, the apparatus 2000 may be configured to perform one or more operations described herein in connection with FIGS. 9-17. Additionally, or alternatively, the apparatus 2000 may be configured to perform one or more processes described herein, such as process 1800 of FIG. 18. In some aspects, the apparatus 2000 and/or one or more components shown in FIG. 20 may include one or more components of the UE described in connection with FIG. 2. Additionally, or alternatively, one or more components shown in FIG. 20 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 2002 may receive communications, such as reference signals, control information, data communications, or a combination thereof, from the apparatus 2008. The reception component 2002 may provide received communications to one or more other components of the apparatus 2000. In some aspects, the reception component 2002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 2000. In some aspects, the reception component 2002 may include one or more antennas, a modem, a demodulator, a MIMO detector, a receive processor, a controller/processor, a memory, or a combination thereof, of the UE described in connection with FIG. 2.

The transmission component 2004 may transmit communications, such as reference signals, control information, data communications, or a combination thereof, to the apparatus 2008. In some aspects, one or more other components of the apparatus 2000 may generate communications and may provide the generated communications to the transmission component 2004 for transmission to the apparatus 2008. In some aspects, the transmission component 2004 may perform signal processing on the generated communications (such as filtering, amplification, modulation, digital-to-analog conversion, multiplexing, interleaving, mapping, or encoding, among other examples), and may transmit the processed signals to the apparatus 2008. In some aspects, the transmission component 2004 may include one or more antennas, a modem, a modulator, a transmit MIMO processor, a transmit processor, a controller/processor, a memory, or a combination thereof, of the UE described in connection with FIG. 2. In some aspects, the transmission component 2004 may be co-located with the reception component 2002 in a transceiver.

The communication manager 2006 may support operations of the reception component 2002 and/or the transmission component 2004. For example, the communication manager 2006 may receive information associated with configuring reception of communications by the reception component 2002 and/or transmission of communications by the transmission component 2004. Additionally, or alternatively, the communication manager 2006 may generate and/or provide control information to the reception component 2002 and/or the transmission component 2004 to control reception and/or transmission of communications.

The transmission component 2004 may transmit an indication of a UE capability for a PDSCH channel estimation for an SBFD operation. The communication manager 2006 may demodulate a PDSCH scheduled based at least in part on the UE capability.

The number and arrangement of components shown in FIG. 20 are provided as an example. In practice, there may be additional components, fewer components, different components, or differently arranged components than those shown in FIG. 20. Furthermore, two or more components shown in FIG. 20 may be implemented within a single component, or a single component shown in FIG. 20 may be implemented as multiple, distributed components. Additionally, or alternatively, a set of (one or more) components shown in FIG. 20 may perform one or more functions described as being performed by another set of components shown in FIG. 20.

Figure 21:
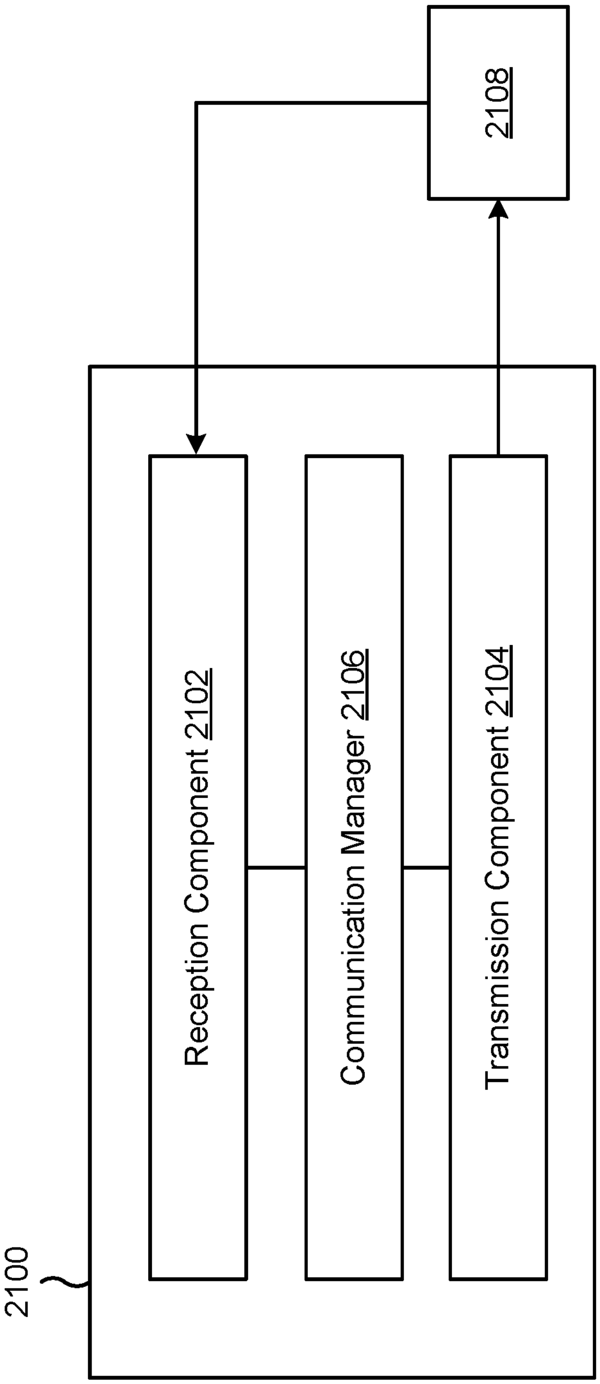

FIG. 21 is a diagram of an example apparatus 2100 for wireless communication, in accordance with the present disclosure. The apparatus 2100 may be a network node, or a network node may include the apparatus 2100. In some aspects, the apparatus 2100 includes a reception component 2102, a transmission component 2104, and/or a communication manager 2106, which may be in communication with one another (for example, via one or more buses and/or one or more other components). In some aspects, the communication manager 2106 is the communication manager 150 described in connection with FIG. 1. As shown, the apparatus 2100 may communicate with another apparatus 2108, such as a UE or a network node (such as a CU, a DU, an RU, or a base station), using the reception component 2102 and the transmission component 2104.

In some aspects, the apparatus 2100 may be configured to perform one or more operations described herein in connection with FIGS. 9-17. Additionally, or alternatively, the apparatus 2100 may be configured to perform one or more processes described herein, such as process 1900 of FIG. 19. In some aspects, the apparatus 2100 and/or one or more components shown in FIG. 21 may include one or more components of the network node described in connection with FIG. 2. Additionally, or alternatively, one or more components shown in FIG. 21 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 2102 may receive communications, such as reference signals, control information, data communications, or a combination thereof, from the apparatus 2108. The reception component 2102 may provide received communications to one or more other components of the apparatus 2100. In some aspects, the reception component 2102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 2100. In some aspects, the reception component 2102 may include one or more antennas, a modem, a demodulator, a MIMO detector, a receive processor, a controller/processor, a memory, or a combination thereof, of the network node described in connection with FIG. 2. In some aspects, the reception component 2102 and/or the transmission component 2104 may include or may be included in a network interface. The network interface may be configured to obtain and/or output signals for the apparatus 2100 via one or more communications links, such as a backhaul link, a midhaul link, and/or a fronthaul link.

The transmission component 2104 may transmit communications, such as reference signals, control information, data communications, or a combination thereof, to the apparatus 2108. In some aspects, one or more other components of the apparatus 2100 may generate communications and may provide the generated communications to the transmission component 2104 for transmission to the apparatus 2108. In some aspects, the transmission component 2104 may perform signal processing on the generated communications (such as filtering, amplification, modulation, digital-to-analog conversion, multiplexing, interleaving, mapping, or encoding, among other examples), and may transmit the processed signals to the apparatus 2108. In some aspects, the transmission component 2104 may include one or more antennas, a modem, a modulator, a transmit MIMO processor, a transmit processor, a controller/processor, a memory, or a combination thereof, of the network node described in connection with FIG. 2. In some aspects, the transmission component 2104 may be co-located with the reception component 2102 in a transceiver.

The communication manager 2106 may support operations of the reception component 2102 and/or the transmission component 2104. For example, the communication manager 2106 may receive information associated with configuring reception of communications by the reception component 2102 and/or transmission of communications by the transmission component 2104. Additionally, or alternatively, the communication manager 2106 may generate and/or provide control information to the reception component 2102 and/or the transmission component 2104 to control reception and/or transmission of communications.

The reception component 2102 may receive an indication of a UE capability for a PDSCH channel estimation for an SBFD operation. The communication manager 2106 may schedule a PDSCH based at least in part on the UE capability.

The number and arrangement of components shown in FIG. 21 are provided as an example. In practice, there may be additional components, fewer components, different components, or differently arranged components than those shown in FIG. 21. Furthermore, two or more components shown in FIG. 21 may be implemented within a single component, or a single component shown in FIG. 21 may be implemented as multiple, distributed components. Additionally, or alternatively, a set of (one or more) components shown in FIG. 21 may perform one or more functions described as being performed by another set of components shown in FIG. 21.

The following provides an overview of some Aspects of the present disclosure:

Aspect 1: A method of wireless communication performed by a user equipment (UE), comprising: transmitting an indication of a UE capability for a physical downlink shared channel (PDSCH) channel estimation for a subband full duplex (SBFD) operation; and demodulating a PDSCH scheduled based at least in part on the UE capability.

Aspect 2: The method of Aspect 1, wherein the UE capability supports two spans of contiguous PDSCH physical resource blocks (PRBs) with a wideband precoding.

Aspect 3: The method of any of Aspects 1-2, wherein the PDSCH is scheduled to span two downlink subbands associated with the SBFD operation, based at least in part on the UE capability.

Aspect 4: The method of Aspect 3, wherein a demodulation reference signal (DMRS) signal is contiguous across the two downlink subbands.

Aspect 5: The method of Aspect 3, wherein a DMRS is scheduled to span the two downlink subbands.

Aspect 6: The method of Aspect 3, wherein a resource block group (RBG) bitmap indicates a frequency domain resource allocation for RBGs in the two downlink subbands, based at least in part on a first type of resource allocation.

Aspect 7: The method of Aspect 3, wherein a resource indicator vector (RIV) indicates physical resource blocks (PRBs) that span the two downlink subbands, two guard bands, and an uplink subband associated with the SBFD operation, based at least in part on a second type of resource allocation.

Aspect 8: The method of Aspect 7, wherein the PRBs are dropped from a PDSCH allocation.

Aspect 9: The method of Aspect 7, wherein the PRBs are dropped from a PDSCH allocation and from a demodulation reference signal (DMRS).

Aspect 10: The method of any of Aspects 1-9, wherein the PDSCH is scheduled in one downlink subband of two downlink subbands associated with the SBFD operation, and the PDSCH is scheduled along with a wideband precoding, based at least in part on the UE capability.

Aspect 11: The method of any of Aspects 1-10, wherein the UE capability specifies a maximum quantity of partial precoding resource block groups (PRGs) with a narrowband precoding for the SBFD operation.

Aspect 12: The method of Aspect 11, wherein an allowed frequency domain resource allocation is based at least in part on the maximum quantity of partial PRGs being equal to two or four, depending on the UE capability.

Aspect 13: The method of any of Aspects 1-12, wherein the UE capability specifies a maximum quantity of partial resource block groups (RBGs) with an active bandwidth part associated with the SBFD operation.

Aspect 14: The method of Aspect 13, wherein the maximum quantity of partial RBGs is equal to two or four, depending on the UE capability, and the maximum quantity of partial RBGs is applicable for a first type of resource allocation.

Aspect 15: The method of any of Aspects 1-14, wherein the UE capability specifies a quantity of time domain demodulation reference signal (DMRS) patterns for a reception of the PDSCH.

Aspect 16: The method of Aspect 15, wherein the quantity of time domain DMRS patterns is equal to one or two, depending on the UE capability.

Aspect 17: The method of Aspect 16, wherein an allowed PDSCH allocation and DMRS pattern is based at least in part on the quantity of time domain DMRS patterns being equal to one, and wherein a time domain resource allocation is based at least in part on non-SBFD symbols and SBFD symbols, and no DMRS is associated with the SBFD symbols.

Aspect 18: The method of Aspect 16, wherein an allowed PDSCH allocation and DMRS pattern is based at least in part on the quantity of time domain DMRS patterns being equal to one, and wherein a time domain resource allocation is based at least in part on non-SBFD-only symbols or SBFD-only symbols.

Aspect 19: The method of Aspect 16, wherein an allowed PDSCH allocation and DMRS pattern is based at least in part on the quantity of time domain DMRS patterns being equal to one, and wherein a resource allocation is based at least in part on non-SBFD symbols, SBFD symbols, and a downlink-subband-only frequency domain resource allocation.

Aspect 20: The method of Aspect 16, wherein an allowed PDSCH allocation and DMRS pattern is based at least in part on the quantity of time domain DMRS patterns being equal to two, and wherein a time domain resource allocation is based at least in part on non-SBFD symbols and SBFD symbols, and DMRS symbols are associated with the non-SBFD symbols and the SBFD symbols.

Aspect 21: The method of Aspect 20, wherein a same quantity of DMRS ports and a same quasi co-location (QCL) assumption are expected between the non-SBFD symbols and the SBFD symbols.

Aspect 22: A method of wireless communication performed by a network node, comprising: receiving an indication of a user equipment (UE) capability for a physical downlink shared channel (PDSCH) channel estimation for a subband full duplex (SBFD) operation; and scheduling a PDSCH based at least in part on the UE capability.

Aspect 23: The method of Aspect 22, wherein the UE capability supports two spans of contiguous PDSCH physical resource blocks (PRBs) with a wideband precoding.

Aspect 24: The method of any of Aspects 22-23, wherein the PDSCH is scheduled to span two downlink subbands associated with the SBFD operation, based at least in part on the UE capability.

Aspect 25: The method of Aspect 24, wherein a demodulation reference signal (DMRS) signal is contiguous across the two downlink subbands.

Aspect 26: The method of Aspect 24, wherein a DMRS is scheduled to span the two downlink subbands.

Aspect 27: The method of Aspect 24, wherein a resource block group (RBG) bitmap indicates a frequency domain resource allocation for RBGs in the two downlink subbands, based at least in part on a first type of resource allocation.

Aspect 28: The method of Aspect 24, wherein a resource indicator vector (RIV) indicates physical resource blocks (PRBs) that span the two downlink subbands, two guard bands, and an uplink subband associated with the SBFD operation, based at least in part on a second type of resource allocation.

Aspect 29: The method of Aspect 28, wherein the PRBs are dropped from a PDSCH allocation.

Aspect 30: The method of Aspect 28, wherein the PRBs are dropped from a PDSCH allocation and from a demodulation reference signal (DMRS).

Aspect 31: The method of any of Aspects 22-30, wherein the PDSCH is scheduled in one downlink subband of two downlink subbands associated with the SBFD operation, and the PDSCH is scheduled along with a wideband precoding, based at least in part on the UE capability.

Aspect 32: The method of any of Aspects 22-31, wherein the UE capability specifies a maximum quantity of partial precoding resource block groups (PRGs) with a narrowband precoding for the SBFD operation.

Aspect 33: The method of Aspect 32, wherein an allowed frequency domain resource allocation is based at least in part on the maximum quantity of partial PRGs being equal to two or four, depending on the UE capability.

Aspect 34: The method of any of Aspects 22-33, wherein the UE capability specifies a maximum quantity of partial resource block groups (RBGs) with an active bandwidth part associated with the SBFD operation.

Aspect 35: The method of Aspect 34, wherein the maximum quantity of partial RBGs is equal to two or four, depending on the UE capability, and the maximum quantity of partial RBGs is applicable for a first type of resource allocation.

Aspect 36: The method of any of Aspects 22-35, wherein the UE capability specifies a quantity of time domain demodulation reference signal (DMRS) patterns for a reception of the PDSCH.

Aspect 37: The method of Aspect 36, wherein the quantity of time domain DMRS patterns is equal to one or two, depending on the UE capability.

Aspect 38: The method of Aspect 37, wherein an allowed PDSCH allocation and DMRS pattern is based at least in part on the quantity of time domain DMRS patterns being equal to one, and wherein a time domain resource allocation is based at least in part on non-SBFD symbols and SBFD symbols, and no DMRS is associated with the SBFD symbols.

Aspect 39: The method of Aspect 37, wherein an allowed PDSCH allocation and DMRS pattern is based at least in part on the quantity of time domain DMRS patterns being equal to one, and wherein a time domain resource allocation is based at least in part on non-SBFD-only symbols or SBFD-only symbols.

Aspect 40: The method of Aspect 37, wherein an allowed PDSCH allocation and DMRS pattern is based at least in part on the quantity of time domain DMRS patterns being equal to one, and wherein a resource allocation is based at least in part on non-SBFD symbols, SBFD symbols, and a downlink-subband-only frequency domain resource allocation.

Aspect 41: The method of Aspect 37, wherein an allowed PDSCH allocation and DMRS pattern is based at least in part on the quantity of time domain DMRS patterns being equal to two, and wherein a time domain resource allocation is based at least in part on non-SBFD symbols and SBFD symbols, and DMRS symbols are associated with the non-SBFD symbols and the SBFD symbols.

Aspect 42: The method of Aspect 41, wherein a same quantity of DMRS ports and a same quasi co-location (QCL) assumption are expected between the non-SBFD symbols and the SBFD symbols.

Aspect 43: An apparatus for wireless communication at a device, comprising a processor; memory coupled with the processor; and instructions stored in the memory and executable by the processor to cause the apparatus to perform the method of one or more of Aspects 1-21.

Aspect 44: A device for wireless communication, comprising a memory and one or more processors coupled to the memory, the one or more processors configured to perform the method of one or more of Aspects 1-21.

Aspect 45: An apparatus for wireless communication, comprising at least one means for performing the method of one or more of Aspects 1-21.

Aspect 46: A non-transitory computer-readable medium storing code for wireless communication, the code comprising instructions executable by a processor to perform the method of one or more of Aspects 1-21.

Aspect 47: A non-transitory computer-readable medium storing a set of instructions for wireless communication, the set of instructions comprising one or more instructions that, when executed by one or more processors of a device, cause the device to perform the method of one or more of Aspects 1-21.

Aspect 48: An apparatus for wireless communication at a device, comprising a processor; memory coupled with the processor; and instructions stored in the memory and executable by the processor to cause the apparatus to perform the method of one or more of Aspects 22-42.

Aspect 49: A device for wireless communication, comprising a memory and one or more processors coupled to the memory, the one or more processors configured to perform the method of one or more of Aspects 22-42.

Aspect 50: An apparatus for wireless communication, comprising at least one means for performing the method of one or more of Aspects 22-42.

Aspect 51: A non-transitory computer-readable medium storing code for wireless communication, the code comprising instructions executable by a processor to perform the method of one or more of Aspects 22-42.

Aspect 52: A non-transitory computer-readable medium storing a set of instructions for wireless communication, the set of instructions comprising one or more instructions that, when executed by one or more processors of a device, cause the device to perform the method of one or more of Aspects 22-42.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
- one or more memories; and
- one or more processors, coupled to the one or more memories, configured to:
  - transmit an indication of a UE capability for a physical downlink shared channel (PDSCH) channel estimation for a subband full duplex (SBFD) operation, wherein the UE capability specifies a maximum quantity of partial precoding resource block groups (PRGs) with a narrowband precoding for the SBFD operation; and
  - demodulate a PDSCH scheduled based at least in part on the UE capability.

2. The apparatus of claim 1, wherein the UE capability supports two spans of contiguous PDSCH physical resource blocks (PRBs) with a wideband precoding.

3. The apparatus of claim 1, wherein the PDSCH is scheduled to span two downlink subbands associated with the SBFD operation, based at least in part on the UE capability.

4. The apparatus of claim 3, wherein a demodulation reference signal is contiguous across the two downlink subbands.

5. The apparatus of claim 3, wherein a demodulation reference signal is scheduled to span the two downlink subbands.

6. The apparatus of claim 3, wherein a resource block group (RBG) bitmap indicates a frequency domain resource allocation for RBGs in the two downlink subbands, based at least in part on a first type of resource allocation.

7. The apparatus of claim 3, wherein a resource indicator vector (RIV) indicates physical resource blocks (PRBs) that span the two downlink subbands, two guard bands, and an uplink subband associated with the SBFD operation, based at least in part on a second type of resource allocation.

8. The apparatus of claim 7, wherein the PRBs are dropped from a PDSCH allocation.

9. The apparatus of claim 7, wherein the PRBs are dropped from a PDSCH allocation and from a demodulation reference signal.

10. The apparatus of claim 1, wherein the PDSCH is scheduled in one downlink subband of two downlink subbands associated with the SBFD operation, and the PDSCH is scheduled along with a wideband precoding, based at least in part on the UE capability.

11. The apparatus of claim 1, wherein an allowed frequency domain resource allocation is based at least in part on the maximum quantity of partial PRGs being equal to two or four, depending on the UE capability.

12. The apparatus of claim 1, wherein the UE capability specifies a maximum quantity of partial resource block groups (RBGs) with an active bandwidth part associated with the SBFD operation.

13. The apparatus of claim 12, wherein the maximum quantity of partial RBGs is equal to two or four, depending on the UE capability, and the maximum quantity of partial RBGs is applicable for a first type of resource allocation.

14. The apparatus of claim 1, wherein the UE capability specifies a quantity of time domain demodulation reference signal (DMRS) patterns for a reception of the PDSCH.

15. The apparatus of claim 14, wherein the quantity of time domain DMRS patterns is equal to one or two, depending on the UE capability.

16. The apparatus of claim 15, wherein an allowed PDSCH allocation and DMRS pattern is based at least in part on the quantity of time domain DMRS patterns being equal to one, and wherein a time domain resource allocation is based at least in part on non-SBFD symbols and SBFD symbols, and no DMRS is associated with the SBFD symbols.

17. The apparatus of claim 15, wherein an allowed PDSCH allocation and DMRS pattern is based at least in part on the quantity of time domain DMRS patterns being equal to one, and wherein a time domain resource allocation is based at least in part on non-SBFD-only symbols or SBFD-only symbols.

18. The apparatus of claim 15, wherein an allowed PDSCH allocation and DMRS pattern is based at least in part on the quantity of time domain DMRS patterns being equal to one, and wherein a resource allocation is based at least in part on non-SBFD symbols, SBFD symbols, and a downlink-subband-only frequency domain resource allocation.

19. The apparatus of claim 15, wherein an allowed PDSCH allocation and DMRS pattern is based at least in part on the quantity of time domain DMRS patterns being equal to two, and wherein a time domain resource allocation is based at least in part on non-SBFD symbols and SBFD symbols, and DMRS symbols are associated with the non-SBFD symbols and the SBFD symbols.

20. The apparatus of claim 19, wherein a same quantity of DMRS ports and a same quasi co-location (QCL) assumption are expected between the non-SBFD symbols and the SBFD symbols.

21. An apparatus for wireless communication at a network node, comprising:

one or more memories; and one or more processors, coupled to the one or more memories, configured to:

receive an indication of a user equipment (UE) capability for a physical downlink shared channel (PDSCH) channel estimation for a subband full duplex (SBFD) operation wherein the UE capability specifies a maximum quantity of partial precoding resource block groups (PRGs) with a narrowband precoding for the SBFD operation; and schedule a PDSCH based at least in part on the UE capability.

22. The apparatus of claim 21, wherein the UE capability supports two spans of contiguous PDSCH physical resource blocks (PRBs) with a wideband precoding.

23. The apparatus of claim 21, wherein the PDSCH is scheduled to span two downlink subbands associated with the SBFD operation, based at least in part on the UE capability.

24. The apparatus of claim 21, wherein the PDSCH is scheduled in one downlink subband of two downlink subbands associated with the SBFD operation, and the PDSCH is scheduled along with a wideband precoding, based at least in part on the UE capability.

25. The apparatus of claim 21, wherein the UE capability specifies a maximum quantity of partial resource block groups (RBGs) with an active bandwidth part associated with the SBFD operation.

26. The apparatus of claim 21, wherein the UE capability specifies a quantity of time domain demodulation reference signal (DMRS) patterns for a reception of the PDSCH.

27. A method of wireless communication performed by a user equipment (UE), comprising:

transmitting an indication of a UE capability for a physical downlink shared channel (PDSCH) channel estimation for a subband full duplex (SBFD) operation, wherein the UE capability specifies a maximum quantity of partial precoding resource block groups (PRGs) with a narrowband precoding for the SBFD operation; and demodulating a PDSCH scheduled based at least in part on the UE capability.

28. The method of claim 27, wherein the PDSCH is scheduled to span two downlink subbands associated with the SBFD operation, based at least in part on the UE capability.

29. The method of claim 28, wherein a demodulation reference signal is scheduled to span the two downlink subbands.

30. A method of wireless communication performed by a network node, comprising:

receiving an indication of a user equipment (UE) capability for a physical downlink shared channel (PDSCH) channel estimation for a subband full duplex (SBFD) operation, wherein the UE capability specifies a maximum quantity of partial precoding resource block groups (PRGs) with a narrowband precoding for the SBFD operation; and scheduling a PDSCH based at least in part on the UE capability.

* * * * *